United States Patent
Aoyama et al.

(10) Patent No.: US 10,207,660 B2
(45) Date of Patent: Feb. 19, 2019

(54) EXTERIOR MEMBER, WIRE HARNESS, AND MANUFACTURING METHOD OF EXTERIOR MEMBER

(71) Applicant: YAZAKI CORPORATION, Tokyo (JP)

(72) Inventors: Yukito Aoyama, Shizuoka (JP); Ryohei Inoue, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/877,205

(22) Filed: Jan. 22, 2018

(65) Prior Publication Data
US 2018/0244220 A1    Aug. 30, 2018

Related U.S. Application Data

(63) Continuation of application No. PCT/JP2016/074061, filed on Aug. 18, 2016.

(30) Foreign Application Priority Data

Aug. 19, 2015   (JP) .................................. 2015-161632
Aug. 2, 2016    (JP) .................................. 2016-151745

(51) Int. Cl.
*B60R 16/02*    (2006.01)
*H02G 3/04*     (2006.01)

(52) U.S. Cl.
CPC ....... *B60R 16/0215* (2013.01); *H02G 3/0406* (2013.01); *H02G 3/0468* (2013.01)

(58) Field of Classification Search
CPC . B60R 16/0215; H02G 3/0406; H02G 3/0468
(Continued)

(56) References Cited

U.S. PATENT DOCUMENTS

2015/0136481 A1*   5/2015   Inao .................... H02G 3/0481
                                                174/72 A
2015/0274095 A1*  10/2015   Inao .................... B60R 16/0215
                                                174/72 A

FOREIGN PATENT DOCUMENTS

JP    11-154421 A     6/1999
JP    2005016259   *  1/2005
(Continued)

OTHER PUBLICATIONS

Written Opinion of the International Search Report for PCT/JP2016/074061 dated Sep. 20, 2016.
(Continued)

*Primary Examiner* — Timothy J Thompson
*Assistant Examiner* — Charles Pizzuto
(74) *Attorney, Agent, or Firm* — Kenealy Vaidya LLP

(57) ABSTRACT

An exterior member having a tubular shape so as to accommodate and protect one conduction path or a plurality of conduction paths includes a resin portion. The resin portion includes a flexible tube portion having flexibility and a straight tube portion so as to linearly route the conduction path. The flexible tube portion and the straight tube portion are continuously formed. The flexible tube portion includes a spiral projection portion in which a first projection having a projecting shape as seen from a tube outer surface side spirally extends in a circumferential direction of the tube outer surface. The straight tube portion includes a straight projection portion in which a second projection continuously extends from an end portion of the spiral projection portion extends in a tube axis direction as the straight tube portion.

5 Claims, 21 Drawing Sheets

(58) Field of Classification Search
USPC .......................................................... 174/72 A
See application file for complete search history.

(56) References Cited

FOREIGN PATENT DOCUMENTS

| JP | 2014-42408 A | | 3/2014 |
|---|---|---|---|
| JP | 2014-143894 A | | 8/2014 |
| JP | 2014-147273 A | | 8/2014 |
| JP | 02155717 | * | 5/2015 |

OTHER PUBLICATIONS

International Search Report and Written Opinion of the International Search Report for PCT/JP2016/074061 dated Sep. 20, 2016.
Japanese Office Action for the related Japanese Patent Application No. 2016-151745 dated Oct. 30, 2018.

* cited by examiner

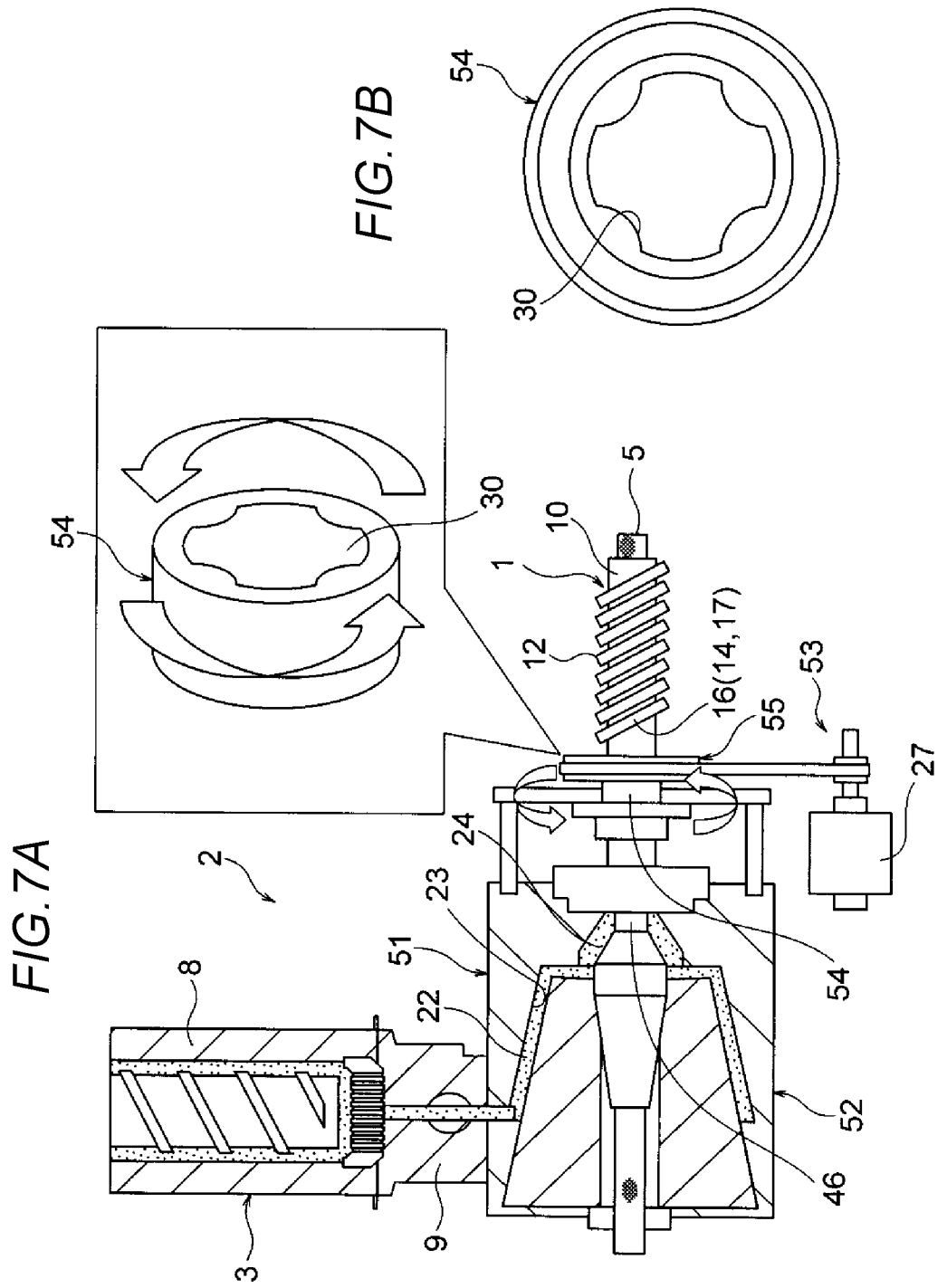

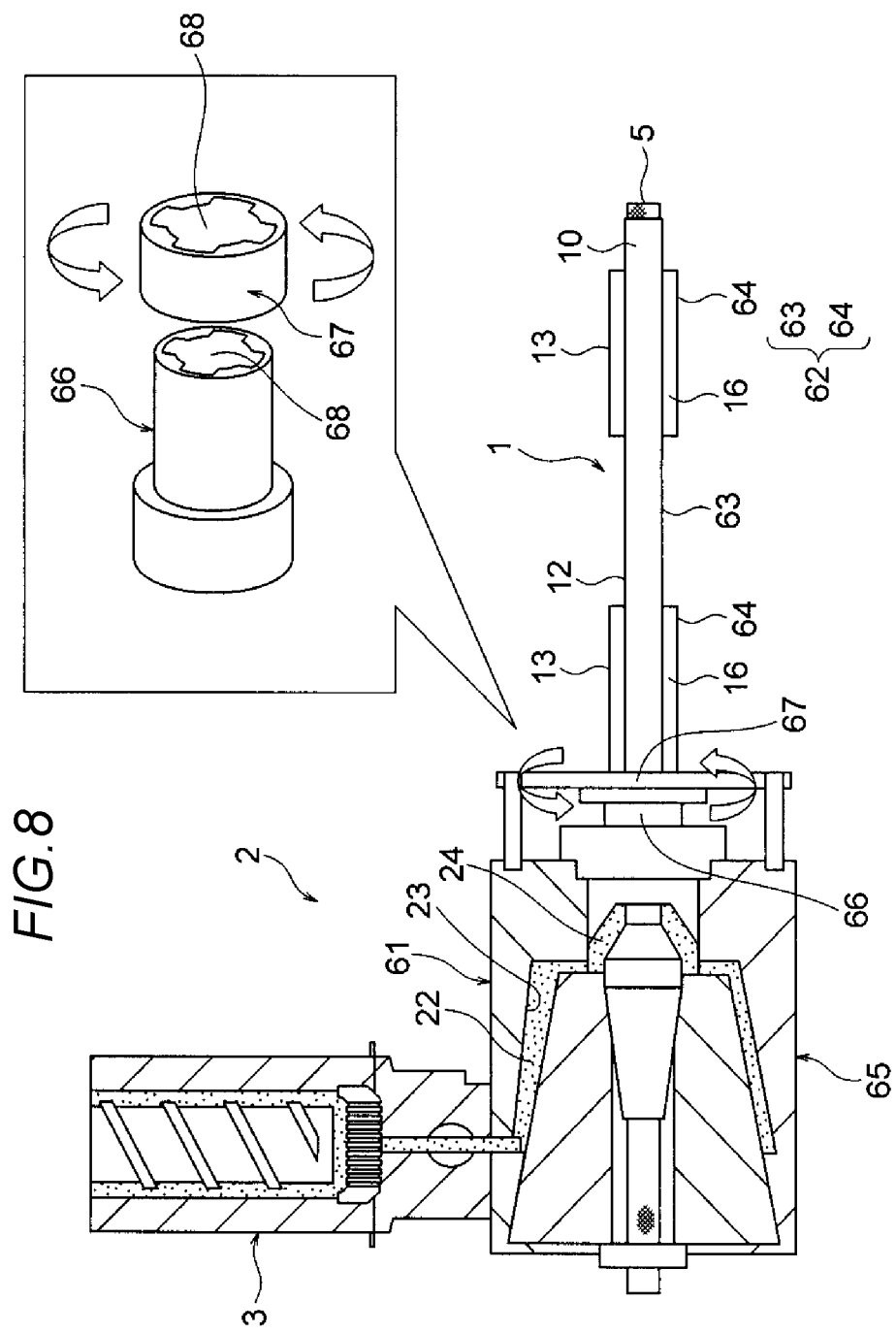

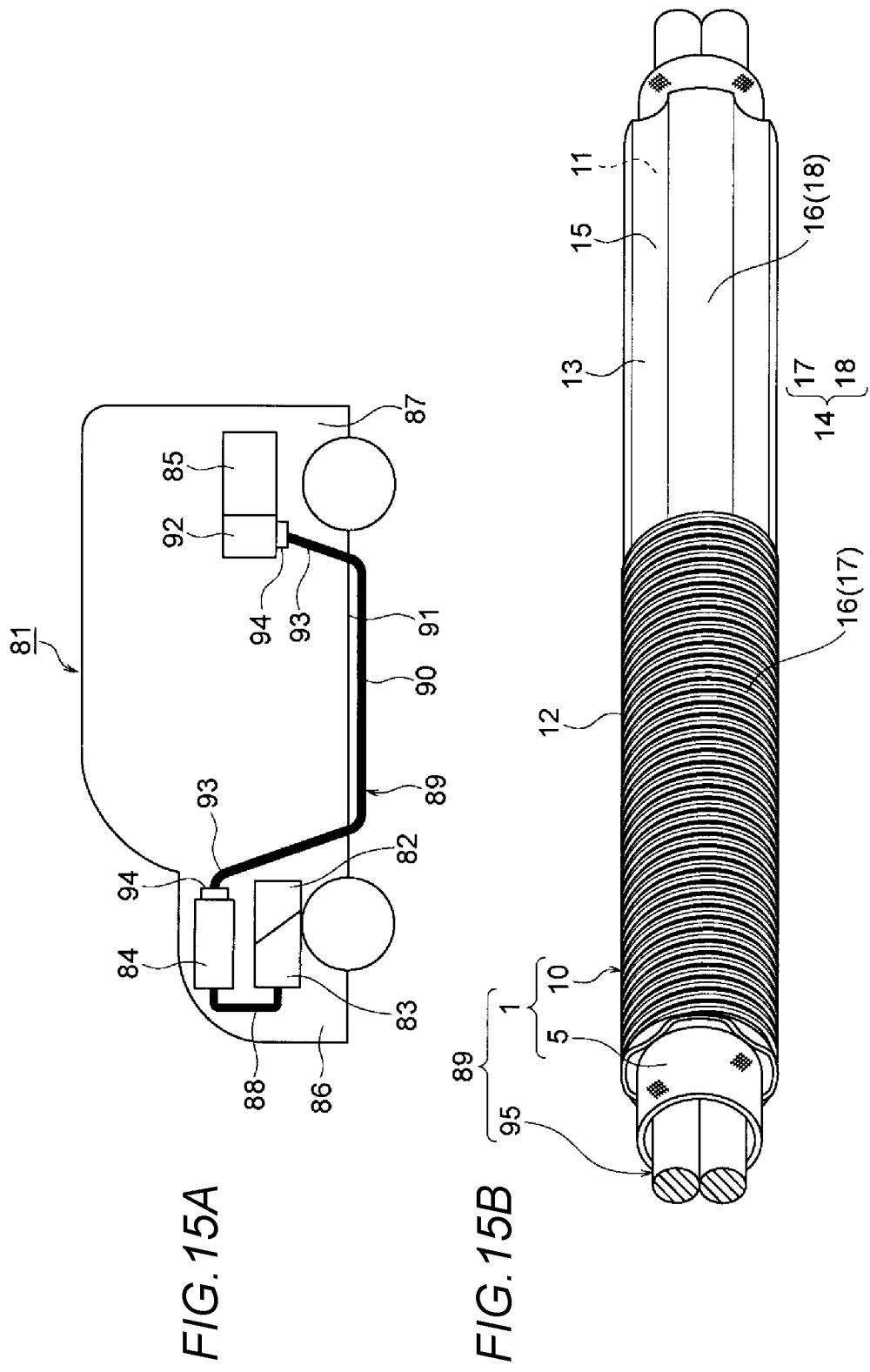

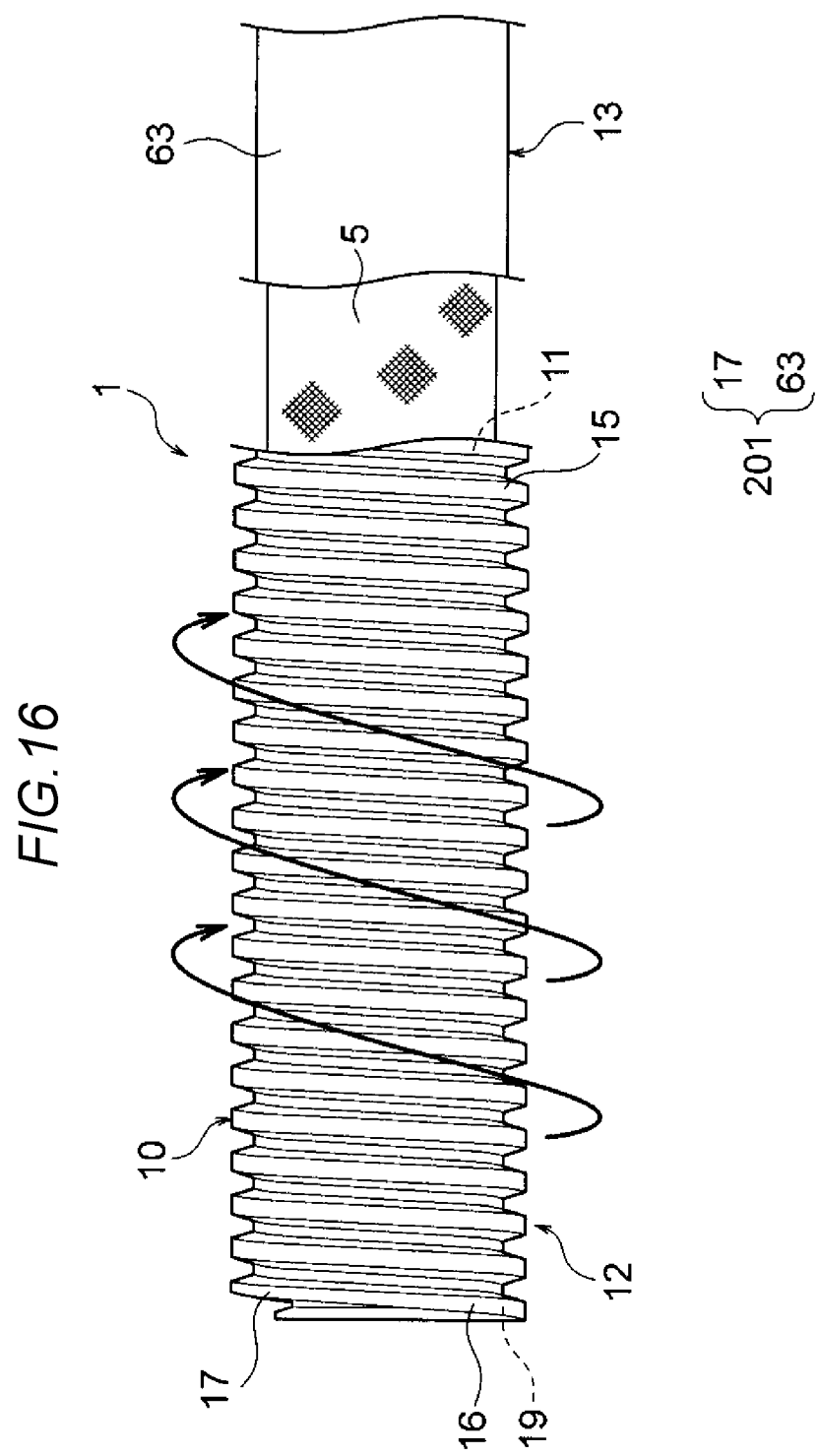

EXTERIOR MEMBER, WIRE HARNESS, AND MANUFACTURING METHOD OF EXTERIOR MEMBER

CROSS REFERENCE TO RELATED APPLICATIONS

This application is a continuation of PCT application No. PCT/JP16/074061, which was filed on Aug. 18, 2016 based on Japanese Patent Application (No. 2015-161632) filed on Aug. 19, 2015, the contents of which are incorporated herein by reference.

BACKGROUND OF THE INVENTION

<Field of the Invention>

The present invention relates to an exterior member that is formed to have a tubular shape in order to accommodate and protect a conduction path, a wire harness that includes the exterior member, and a manufacturing method of the exterior member.

<Description of Related Art>

For example, as an example of a high-voltage wire harness, the patent document 1 below discloses a wire harness for electrically connecting high-voltage devices to each other, the high-voltage devices being built into a hybrid automobile or an electric automobile. The wire harness in the patent document 1 has been invented by the applicant of the present application and is configured to include one conduction path or a plurality of conduction paths, and a tubular exterior member that protects the one conduction path or the plurality of conduction paths with the one conduction path or the plurality of conduction paths being inserted therein. The conduction path is configured to have a shielding function. Specifically, the conduction path is configured such that a shield member such as a braid is disposed inside or outside a sheath. The exterior member includes a flexible tube portion that is flexible and a straight tube portion for linearly routing the conduction path. According to the patent document 1, the exterior member is manufactured as follows.

In FIG. 20, an extrusion molding machine 102 that is a manufacturing apparatus for resin molding of an exterior member 101 is configured to include a resin extruding unit 103, a molding unit 104 that is disposed on the downstream side of the resin extruding unit 103, and a cooling unit and a cutting unit (not shown) that are disposed on the downstream side of the molding unit 104. The resin extruding unit 103 is configured to include a hopper 105 as a unit into which resin material is inserted, an extruding unit main body 106 that continuously extends from the hopper 105 and extends in a horizontal direction, and a nozzle portion 107 that protrudes from an end portion of the extruding unit main body 106. The nozzle portion 107 includes a resin material extrusion port and the resin material extrusion port is disposed inside an inlet of the molding unit 104.

In FIGS. 20 and 21, the molding unit 104 has a configuration in which resin molding can be linearly performed over an area from the inlet to an outlet. Specifically, the molding unit includes approximately caterpillar-shaped mold constituting portions 108. A pair of mold constituting portions 108 is disposed such that the mold constituting portions 108 are positioned on both sides of flexible resin material 109 (the resin material) extruded from the resin material extrusion port of the nozzle portion 107. The pair of mold constituting portions 108 is configured to be capable of forming the resin material 109 into a predetermined shape. Following is more detailed description of the mold constituting portion 108. The mold constituting portion 108 is configured to include a pair of timing pulleys 110 that extend in an extrusion direction of the resin material 109, an endless belt (not shown) that is moved by the pair of timing pulleys 110 in directions denoted by arrows in the drawing, and a mold block aggregate 111 that moves being attached to the endless belt.

The mold block aggregate 111 includes a plurality of mold blocks 112. The mold blocks 112 are arranged with no gap therebetween in a straight portion of the endless belt and is moved by the endless belt. In an area inside the mold blocks 112 being arranged with no gap therebetween, the resin material 109 is pressed toward a gap between molds due to air pressure generated by an air ball 113. When mold opening of the mold blocks 112 is performed, each portion of the exterior member 101 formed into the predetermined shape is extruded toward the downstream side.

Meanwhile, FIG. 20B illustrates a portion of the exterior member 101 that corresponds to a flexible tube portion 114. The flexible tube portion 114 is a flexible portion and is formed into a bellows tube-like shape. Specifically, the flexible tube portion 114 includes bellows recess portions 115 and bellow projection portions 116 that extend in a circumferential direction around a tube axis and the flexible tube portion 114 is formed such that the bellows recess portions 115 and the bellows projection portions 116 are alternately and continuously arranged in a tube axis direction.

[Patent Document 1] JP-A-2014-143894

A related art has a problem of high manufacturing cost since the extrusion molding machine 102 is used for resin molding of the exterior member 101 and the molding unit 104 of the extrusion molding machine 102 includes a lot of constituent members. In addition, the related art has a problem that the manufacturing cost of the conduction path increases by the cost of the shield member since the conduction path has the shielding function.

In recent years, it is desired that a flexible tube portion of an exterior member is more likely to be bent.

SUMMARY

One or more embodiments provide an exterior member which can be manufactured at low cost, a wire harness which includes the exterior member, and a method of manufacturing an exterior member at low cost.

In an aspect (1), an exterior member having a tubular shape so as to accommodate and protect one conduction path or a plurality of conduction paths includes a resin portion. The resin portion includes a flexible tube portion having flexibility and a straight tube portion so as to linearly route the conduction path. The flexible tube portion and the straight tube portion are continuously formed. The flexible tube portion includes a spiral projection portion in which a first projection having a projecting shape as seen from a tube outer surface side spirally extends in a circumferential direction of the tube outer surface. The straight tube portion includes a straight projection portion in which a second projection continuously extends from an end portion of the spiral projection portion extends in a tube axis direction as the straight tube portion. An outer diameter of the first projection of the spiral projection portion is equal to an outer diameter of the second projection of the straight projection portion, and an outer diameter of a recess adjoining to the first projection is equal to an outer diameter of a recess adjoining to the second projection.

In an aspect (2), the exterior member in the aspect (1), further includes a shield member that is disposed on a tube inner surface side of the resin portion and is made of conductive metal.

In an aspect (3), a wire harness includes the exterior member in the aspect (1) or (2) and the one conduction path or the plurality of conduction paths accommodated and protected in the exterior member.

In an aspect (4), a wire harness which includes an exterior member having a tubular shape and one conduction path or a plurality of conduction paths accommodated and protected in the exterior member, the exterior member including a resin portion including a flexible tube portion having flexibility. The flexible tube portion includes a spiral projection portion in which a projection that has a projecting shape as seen from a tube outer surface side spirally extends in a circumferential direction of the tube outer surface.

In an aspect (5), a manufacturing method of an exterior member which has a tubular shape so as to accommodate and protect one conduction path or a plurality of conduction paths and includes a resin portion in which a flexible tube portion having flexibility and a straight tube portion so as to linearly route the conduction path are continuously formed, the method includes forming a spiral projection portion in which a first projection that has a projecting shape as seen from a tube outer surface side spirally extends in a circumferential direction of the tube outer surface as the flexible tube portion, and forming a straight projection portion in which a second projection that has a projecting shape as seen from the tube outer surface side continuously extends from an end portion of the spiral projection portion and extends in a tube axis direction as the straight tube portion. An outer diameter of the first projection of the spiral projection portion is equal to an outer diameter of the second projection of the straight projection portion, and an outer diameter of a recess adjoining to the first projection is equal to an outer diameter of a recess adjoining to the second projection.

In an aspect (6), the manufacturing method of an exterior member in the aspect (5), further includes providing a shield member that is disposed on a tube inner surface side of the resin portion and is made of conductive metal.

According to the aspects (1) to (6) above, an exterior member includes a resin portion that includes a flexible tube portion and a straight tube portion, and the resin portion has any one of a configuration in which a projection is continuously formed over an entire resin portion (hereinafter, referred to as a "continuous projection portion") and a configuration in which the projection is intermittently formed over a resin portion (hereinafter, referred to as an "intermittent projection portion"). A continuous projection portion has a configuration including a spiral projection portion in which the projection spirally extends in a circumferential direction of the tube outer surface and a straight projection portion that continuously extends from an end portion of the spiral projection portion and extends in a tube axis direction. Meanwhile, an intermittent projection portion has a configuration including a non-projecting portion in which the projection is not present and the projecting portion in which the projection extends in the tube axis direction. The intermittent projection portion has a configuration including the spiral projection portion and the non-projecting portion.

For example, a case of the continuous projection portion will be described below. If an extrusion molding machine is configured to include a die and a nipple having such a shape that the projection is formed and the die and the nipple are rotated when resin material is extruded by using the extrusion molding machine, the spiral projection portion is formed. The spiral projection portion is formed into a shape different from the shape of the bellows tube in the related art by adjusting the rotation speed of the die and the nipple. That is, the spiral projection portion is formed as a spiral-shaped flexible portion having an approximately bellows tube-like shape. Since the spiral projection portion has a spiral-like shape and is flexible, the spiral projection portion is likely to be bent. Meanwhile, if the resin material is extruded in a state where the die and the nipple are not rotated, the straight projection portion is formed. The straight projection portion is formed into a straight shape that extends in the tube axis direction since the die and the nipple are not rotated. Accordingly, the straight projection portion is formed to function as a so-called reinforcement rib for securing rigidity. Since the straight projection portion has such a shape and function, the straight projection portion is formed as a useful portion of the straight tube portion.

A case of the intermittent projection portion will be briefly described below. (1) If the non-projecting portion in which the projection is not present and the projecting portion in which the projection extends straight in the tube axis direction are formed, the non-projecting portion corresponds to the flexible tube portion of the exterior member and the projecting portion corresponds to the straight tube portion. Meanwhile, (2) if the intermittent projection portion is formed into a shape with the non-projecting portion and the spiral projection portion, the non-projecting portion corresponds to the straight tube portion of the exterior member and the spiral projection portion corresponds to the flexible tube portion. According to (1) and (2) above, it can be found that being the straight tube portion or the flexible tube portion depends on a direction in which the projection extends.

Furthermore, according to the invention, since the shield member is provided, it is possible for the exterior member to have a shielding function. In addition, it is also possible to simplify a configuration and structure of the conduction path.

According to the aspects in (1), (3), (4), and (5), a shape of an exterior member has a characteristic and a shape having a characteristic does not degrade an original function of the exterior member. Therefore, it is possible to manufacture the exterior member by using a device configuration different from that of the extrusion molding machine used in the related art. Specifically, it is possible to manufacture the exterior member by using a device configuration which is less expensive than that in the related art. Therefore, according to the invention, it is possible to provide an exterior member that can be manufactured at low cost, a wire harness that includes the exterior member, and a method of manufacturing an exterior member at low cost. In addition, according to the invention, although description will be provided in Examples below, if a spiral projection portion is formed on a flexible tube portion, it is possible to make the flexible tube portion be more likely to be bent than that in the related art.

In addition, according to the aspects (2) and (6), it is possible for the exterior member to have a shielding function. In addition, it is also possible to simplify a configuration and structure of the conduction path.

Hereinabove, the invention has been briefly described. Furthermore, when embodiments of the invention (hereinafter, referred to as "embodiments") described below are read through with reference to reference drawings, the details of the invention will be more clarified.

BRIEF DESCRIPTION OF THE DRAWINGS

FIG. 1A is a schematic view illustrating a configuration of an extrusion molding machine for manufacturing the exterior member and FIG. 1B is a view illustrating a configuration of the exterior member (Example 1).

FIG. 5A is a view illustrating a state where extrusion has been performed with the die and the nipple being not rotated. FIG. 5B is a view illustrating a state where extrusion has been performed with the die and the nipple being rotated slowly. FIG. 5C is a view illustrating a state where extrusion has been performed with the die and the nipple being rotated fast (Example 1).

FIGS. 7A and 7B are schematic views illustrating a configuration of a rotation head in still another example (Example 3).

FIG. 8 is a schematic view illustrating a configuration of a rotation head in still another example (Example 4).

FIG. 10A is an external view and FIGS. 10B and 10C are sectional views (Example 5).

FIG. 11A is an external view and FIGS. 11B and 11C are sectional views (Example 5).

FIG. 12A is an external view and FIGS. 12B and 12C are sectional views (Example 5).

FIGS. 13A to 11C are views of the flexible tube portion in the exterior member. FIG. 13A is an external view and FIGS. 13B and 13C are sectional views (Example 5).

FIG. 14A is a schematic view illustrating a configuration of the extrusion molding machine. FIG. 14B is a front view of the die. FIG. 14C is a sectional view of the die. FIG. 14D is a view illustrating a state where melted resin is extruded from the die (Example 6).

FIGS. 15A and 15B are views illustrating a wire harness of the invention. FIG. 15A is a schematic view illustrating a routing state of the wire harness. FIG. 15B is a view illustrating a configuration of the wire harness (Example 7).

FIG. 16 is a view illustrating a configuration of the exterior member (Example 8).

DETAILED DESCRIPTION

An exterior member is formed to have a tubular shape in order to accommodate and protect a conduction path. A resin portion of the exterior member includes a flexible tube portion that is flexible and a straight tube portion for linearly routing the conduction path. The flexible tube portion and the straight tube portion are continuously formed. On the flexible tube portion and the straight tube portion, a continuous projection portion or an intermittent projection portion is formed. The continuous projection portion is formed into a shape that includes a spiral projection portion in which a projection spirally extends in a circumferential direction of a tube outer surface as seen from the tube outer surface side and a straight projection portion that continuously extends from an end portion of the spiral projection portion and extends in a tube axis direction. Meanwhile, the intermittent projection portion is formed into a shape that includes a non-projecting portion in which the projection is not present and a projecting portion that extends in the tube axis direction. Alternatively, the intermittent projection portion is formed into a shape with the non-projecting portion and the spiral projection portion.

Example 1

Figure 1:
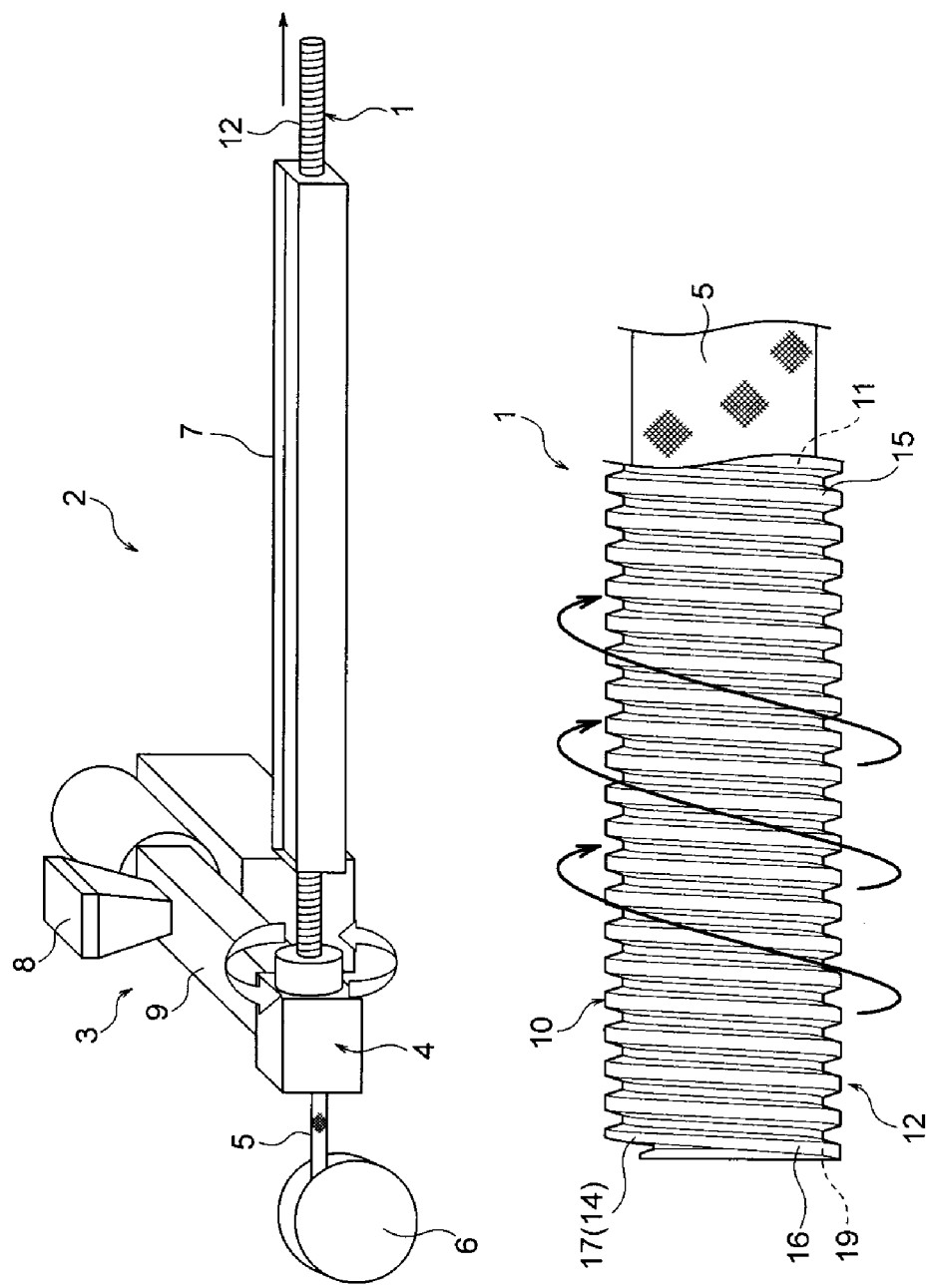
FIGS. 1A and 1B are views of an exterior member according to an embodiment of the invention.
Figure 2:
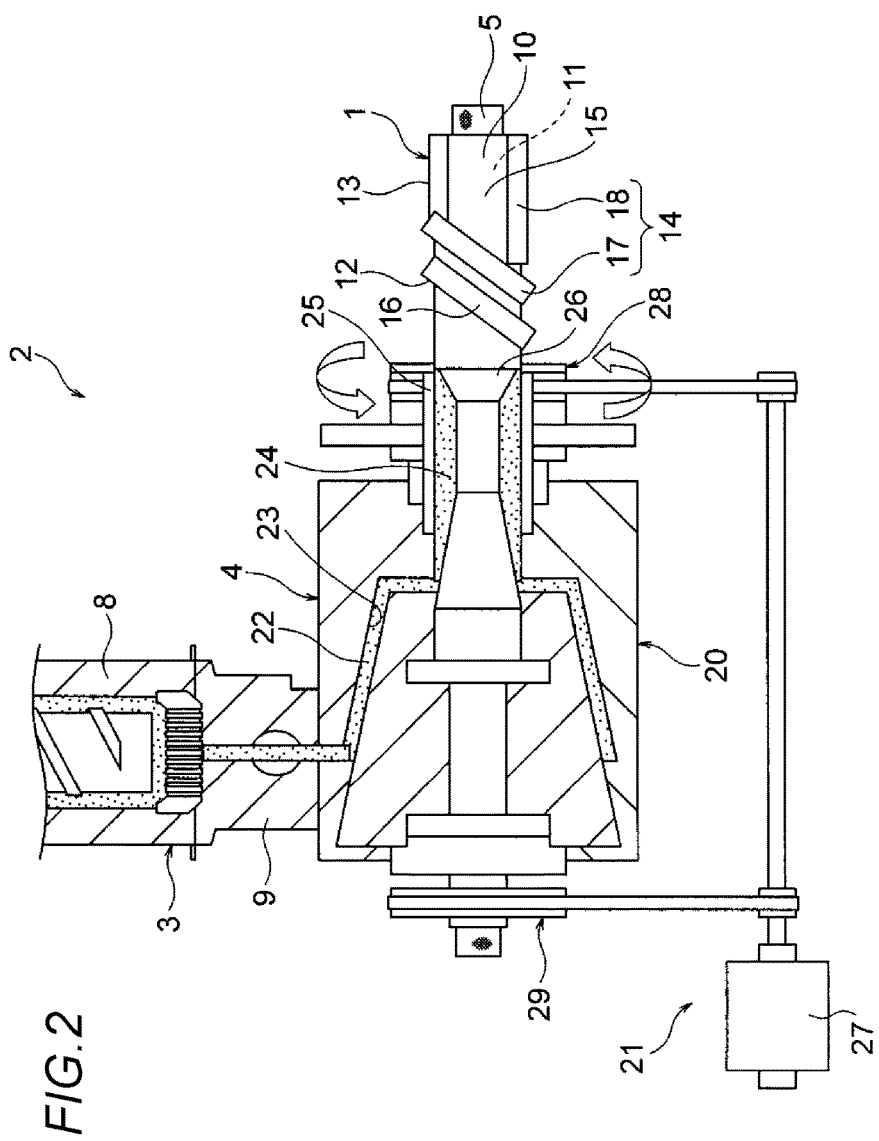
FIG. 2 is a schematic view illustrating a configuration of a rotation head in FIG. 1 (Example 1).
Figure 4:
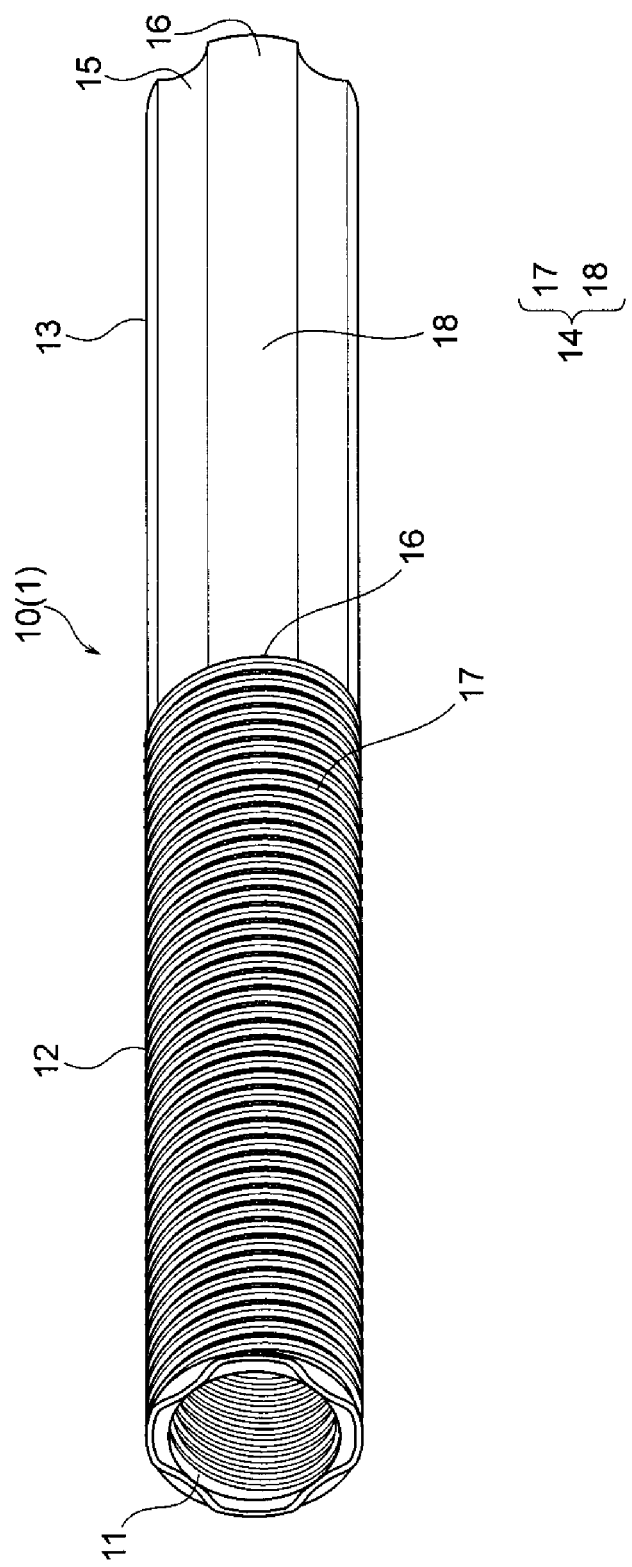
FIG. 4 is a perspective view of a resin portion of the exterior member (Example 1).
Figure 5A:
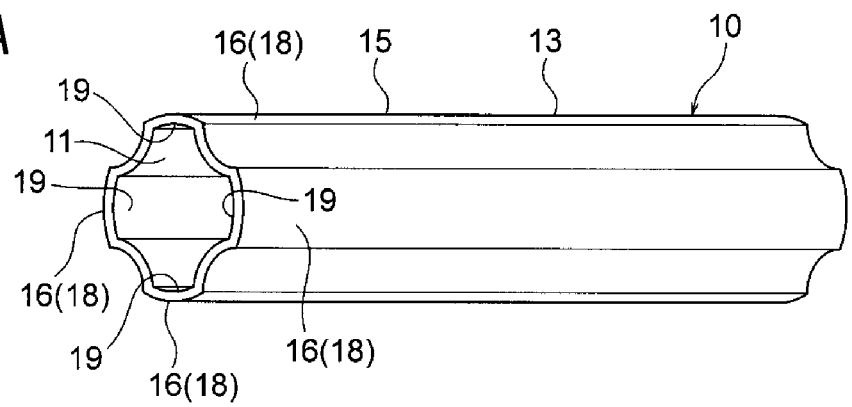
FIGS. 5A to 5C are views related to the resin portion of the exterior member.
Figure 5B:
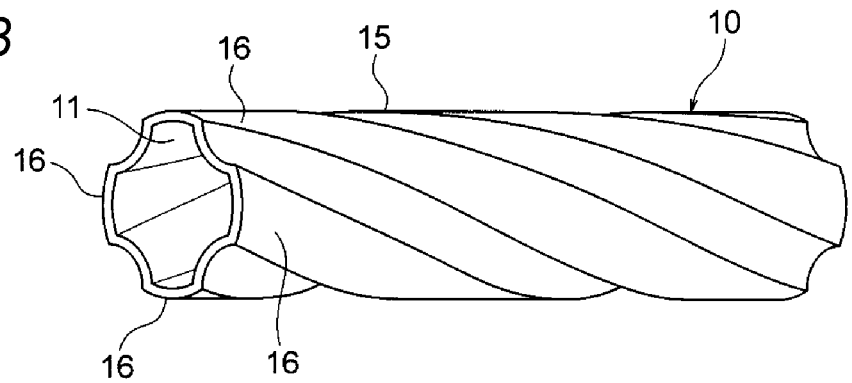
Figure 5C:
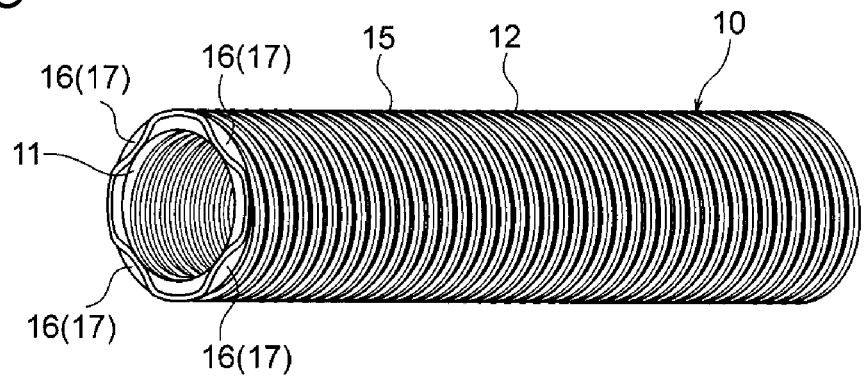

Hereinafter, Example 1 will be described with reference to drawings. FIGS. 1A and 1B are views related to the exterior member of the present invention. FIG. 1A is a schematic view illustrating a configuration of an extrusion molding machine for manufacturing the exterior member and FIG. 1B is a view illustrating a configuration of the exterior member. In addition, FIG. 2 is a schematic view illustrating a configuration of a rotation head in FIG. 1A, FIGS. 3A to 3C are views related to a die and a nipple in FIG. 2, FIG. 4 is a perspective view of a resin portion of the exterior member, and FIGS. 5A to 5C are views related to the resin portion of the exterior member. FIG. 5A is a view illustrating a state where extrusion has been performed with the die and the nipple being not rotated, FIG. 5B is a view illustrating a state where extrusion has been performed with the die and the nipple being rotated slowly, and FIG. 5C is a view illustrating a state where extrusion has been performed with the die and the nipple being rotated fast.

<Summary of Configuration of Exterior Member 1 and Extrusion Molding Machine 2>

In FIGS. 1A and 1B, an extrusion molding machine 2, which is a manufacturing apparatus for resin molding of an exterior member 1, includes a resin extruding unit 3, a rotation head 4 that is integrally provided while being positioned on the downstream side of the resin extruding unit 3, a braid supplying unit 6 that supplies a braid 5 (a shield member) to the rotation head 4, a cooling water tank 7 that is disposed separately while being positioned on the downstream side of the rotation head 4, and a cutting unit (not shown) that is disposed separately while being positioned on the downstream side of the cooling water tank 7.

Figures 20A, 20B:
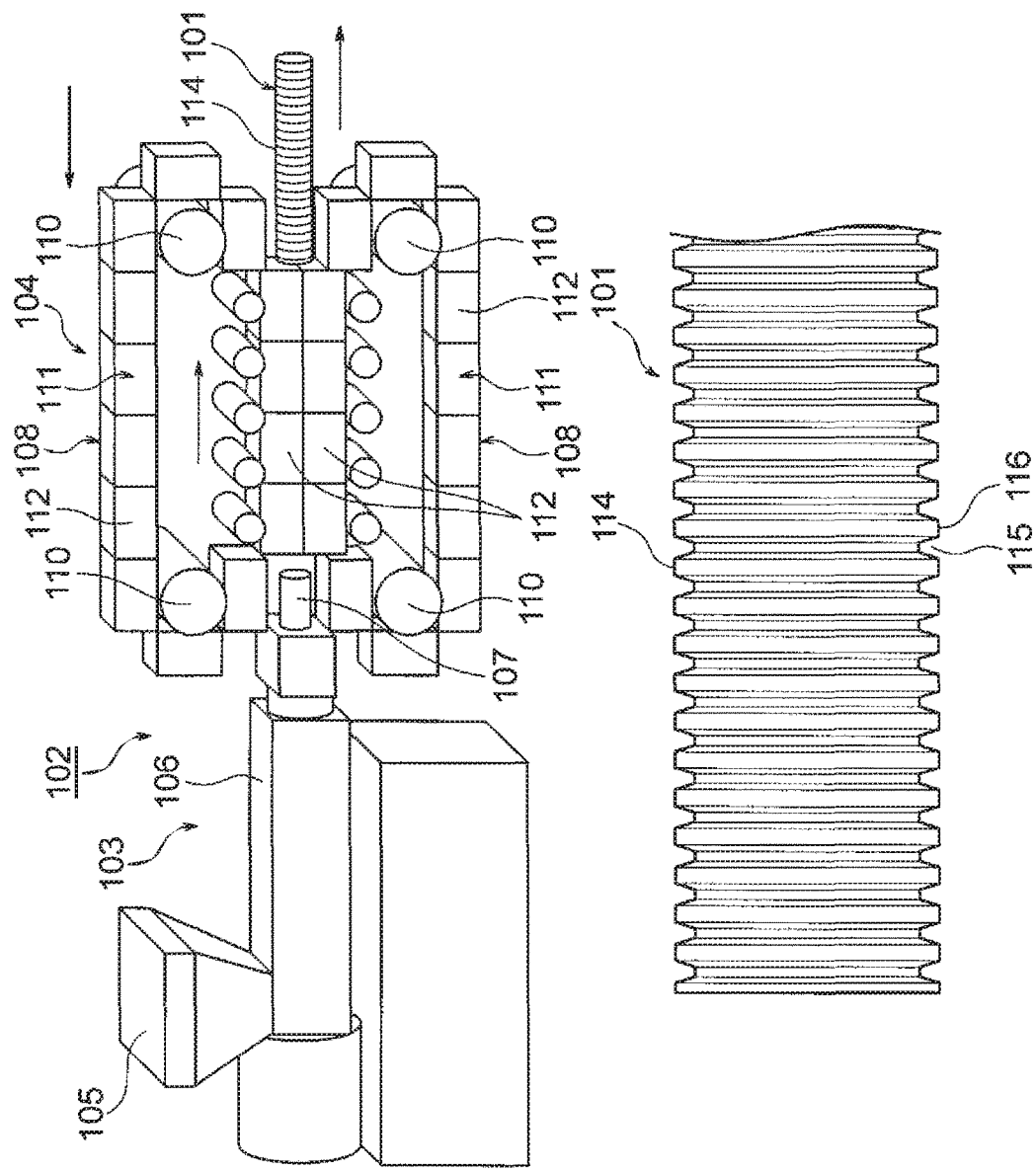
FIG. 20A is a schematic view illustrating a configuration of an extrusion molding machine in the related art.
FIG. 20B is an example of an exterior member molded by the extrusion molding machine.
Figure 21:
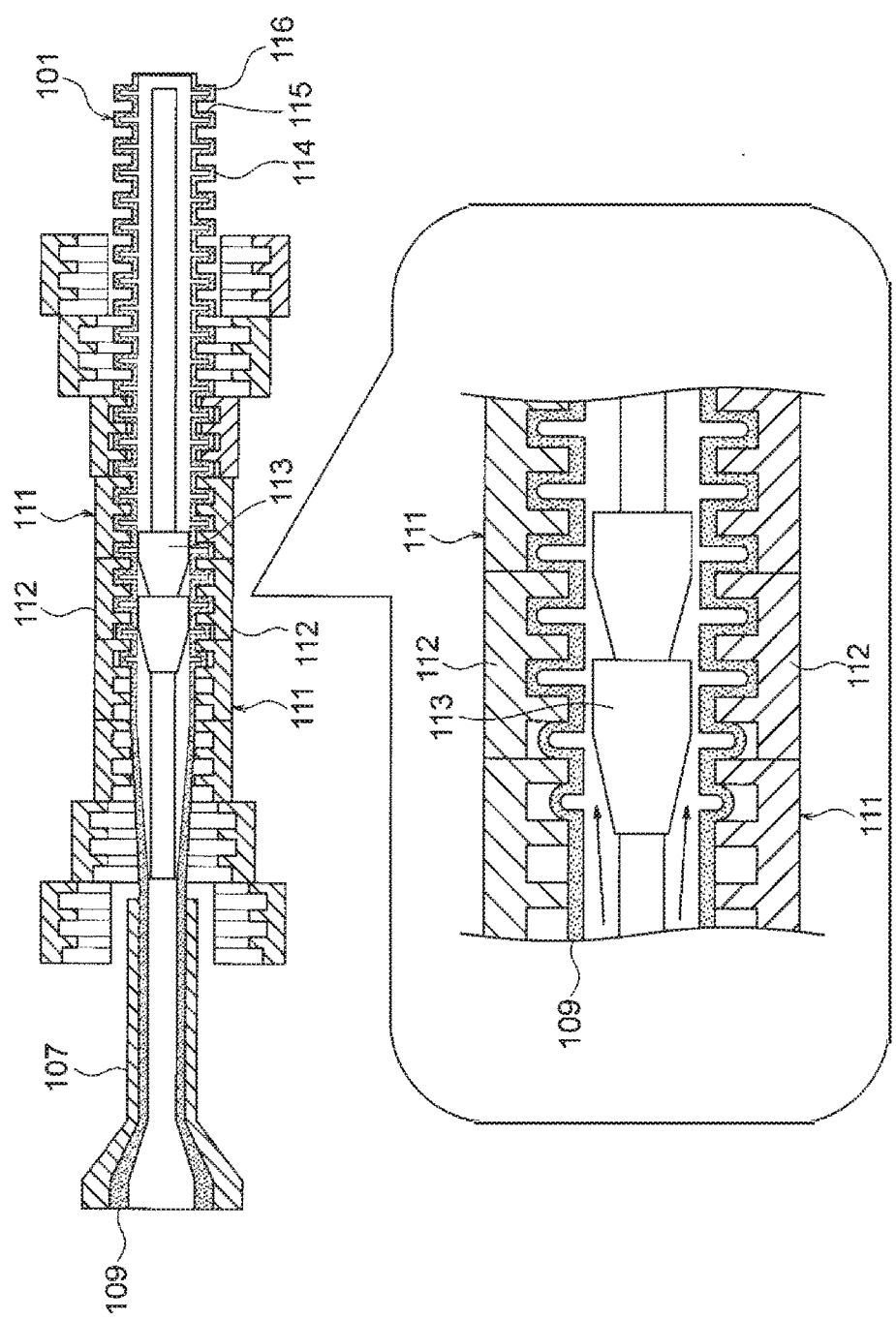
FIG. 21 is a schematic view illustrating a configuration of a molding unit in FIG. 20.

The resin extruding unit 3 basically has the same configuration as the resin extruding unit 103 (refer to FIGS. 20A and 20B) in the related art and includes a hopper 8 and an extruding unit main body 9. Detailed description of the resin extruding unit 3 will be omitted. In addition, the cooling water tank 7 and the cutting unit (not shown) are well known and thus description thereof will be omitted.

The exterior member 1 in the present example is configured to include a resin portion 10 that is formed into a tubular shape and the braid 5 that is disposed on a tube inner surface 11 side of the resin portion 10. Since the exterior member 1 has such a configuration, components constituting important devices in the extrusion molding machine 2 are the rotation head 4 and the braid supplying unit 6. First, a configuration and structure of the exterior member 1 will be described and the braid supplying unit 6 and the rotation head 4 will be described next in this order.

<Exterior Member 1>

In FIGS. 1B, 4, and 5A to 5C, the resin portion 10 of the exterior member 1 is formed into one straight tubular shape through resin molding (the resin portion 10 has a straight shape immediately after the exterior member 1 is molded and before the exterior member 1 is used). In addition, the exterior member 1 is formed into a shape without cuts. In other words, the exterior member 1 is formed into a shape without slits (is formed into a shape other than a divided tube-like shape).

The exterior member 1 as described above includes flexible tube portions 12 that are flexible and straight tube portions 13 for linearly routing a conduction path 95 (refer to FIGS. 15A and 15B), which will be described later. A plurality of flexible tube portions 12 and straight tube portions 13 are formed. In addition, the flexible tube portions 12 and the straight tube portions 13 are formed to be alternately disposed in a tube axis direction.

The flexible tube portions 12 are disposed in accordance with a vehicle installation shape (the shape of the target of wire harness routing (the shape of the fixation target)). In addition, the flexible tube portions 12 are formed to have lengths in accordance with the vehicle installation shape. The lengths of the flexible tube portions 12 are not uniform and each of the flexible tube portions 12 is formed to have a necessary length in accordance with the vehicle installation shape. The flexible tube portions 12 as described above are formed such that each of the flexible tube portions 12 can be bent at a predetermined angle when a wire harness 89 (refer to FIGS. 15A and 15B), which will be described later, is in a packaged state, is transported, and is routed in a route in a vehicle. That is, the flexible tube portions 12 are formed such that the flexible tube portions 12 can be bent into a curved shape and can return to the original shape which is straight as illustrated in FIG. 4 (a state at a time of the resin molding) of course.

Each straight tube portion 13 is formed as a portion that is not flexible unlike the flexible tube portions 12. In addition, each straight tube portion 13 is formed as a portion that is not bent when being packaged, transported, or routed in a route (a portion that is not bent means a portion that is not actively flexible). The straight tube portion 13 in the drawing is formed into a long straight tubular shape.

Each straight tube portion 13 is formed as a portion that is rigid in comparison with the flexible tube portions 12. The straight tube portions 13 are formed to be positioned and to have lengths in accordance with the vehicle installation shape. In this example, each straight tube portion 13 is formed as a portion that is disposed at least on a vehicle underfloor portion 91 (refer to FIGS. 15A and 15B) which will be described later.

More specifically, the flexible tube portions 12 and the straight tube portions 13 as described above are formed into a shape with a continuous projection portion 14 which is one of the characteristics of the invention.

<Continuous Projection Portion 14>

In FIG. 4, the continuous projection portion 14 is formed into a shape that includes a spiral projection portion 17 in which a projection 16 spirally extends (refer to an arrow in FIG. 1B) in a circumferential direction of a tube outer surface 15 as seen from the tube outer surface 15 side and a straight projection portion 18 that continuously extends from an end portion of the spiral projection portion 17 and extends in the tube axis direction. The spiral projection portion 17 in the continuous projection portion 14 is formed as a portion that corresponds to the flexible tube portion 12. In addition, the straight projection portion 18 is formed as a portion that corresponds to the straight tube portion 13.

Figure 13A:
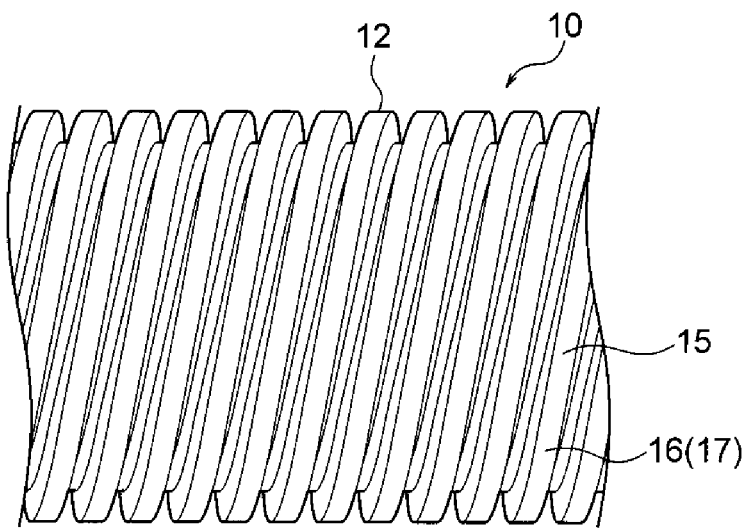
Figure 13B:
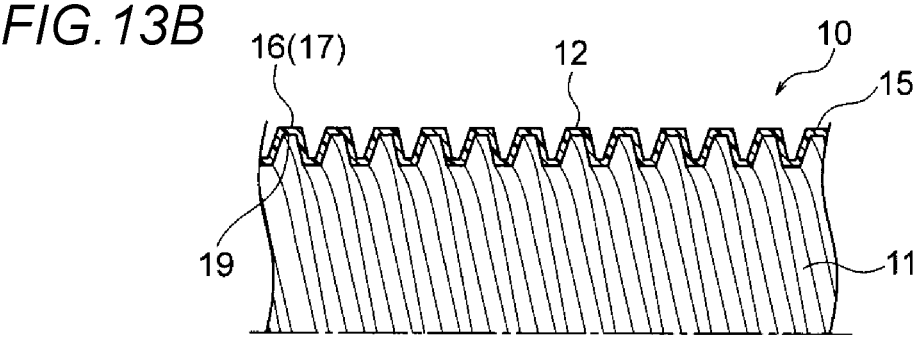

The projection 16 is formed as a recess portion 19 (refer to FIGS. 5 and 13) as seen from the tube inner surface 11 side. In addition, portions on the both sides of the projection 16 are formed as recess portions as seen from the tube external surface 15 side, although the portions are not given specific reference numerals (similarly, portions on the both sides of the recess portion 19 are formed as projections as seen from the tube inner surface 11 side).

Each of the flexible tube portions 12 (the spiral projection portion 17) is formed with the projection 16 spirally extending as illustrated by the arrow in FIG. 1B. Accordingly, when the shape of the flexible tube portion 12 is compared with a shape in FIG. 20B, it is easily found that each flexible tube portion 12 is formed into a shape different from the shape of a bellows tube in the related art. Note that, when referring to FIGS. 5A to 5C, it is easy to imagine a process in which the projection 16 is spirally formed. That is, FIG. 5A is a state where the projection 16 is straight, and when the resin molding is performed while rotating device side components, which will be described later, the projection 16 also changes to a state in FIG. 5B, a state in FIG. 5C, and a spiral shape in accordance with a change in rotation speed.

<Braid Supplying Unit 6>

In FIGS. 1A and 1B, the braid supplying unit 6 is provided in order to supply the braid 5 to the rotation head 4 as described above. The braid 5 is formed by weaving a conductive metal wire into a tubular shape (there is also a method of forming the braid by rolling up a net into a tubular shape instead of the weaving). After the braid 5 is supplied to the rotation head 4, the braid 5 is disposed on the tube inner surface 11 side of the resin portion 10 in the exterior member 1 in accordance with a configuration and structure of the rotation head 4 (refer to FIG. 1B).

The shield member may be a metal foil of which the main element is copper, aluminum, or iron, a metal fiber, a conductive resin impregnated with CNT, or the like instead of the braid 5 in this example.

<Rotation Head 4>

In FIGS. 1A and 2, the rotation head 4 is obtained by adding a rotation/driving mechanism to a so-called cross head and is configured to include a rotation head main body 20 and a rotation/driving mechanism 21. The rotation head main body 20 is configured to include a resin material path 23 with respect to melted resin material 22 (resin material), a resin material extrusion portion 24 at which the melted resin material 22 is extruded, and a die 25 and a nipple 26 that are disposed at the position of the resin material extrusion portion 24. In addition, the rotation/driving mechanism 21 is configured to include a motor 27, a die rotation mechanism 28 for rotating the die 25 with the motor 27 being driven, a nipple rotation mechanism 29 for rotating the nipple 26 at the same speed as the die 25 with the motor 27 being driven as with the die rotation mechanism 28, and a controller (not shown) that controls the motor 27.

As understood from the above-described configuration, the rotation head 4 has a configuration and structure in which the melted resin material 22 is extruded while passing through a portion with the rotatable die 25 and the nipple 26.

Figure 3A:
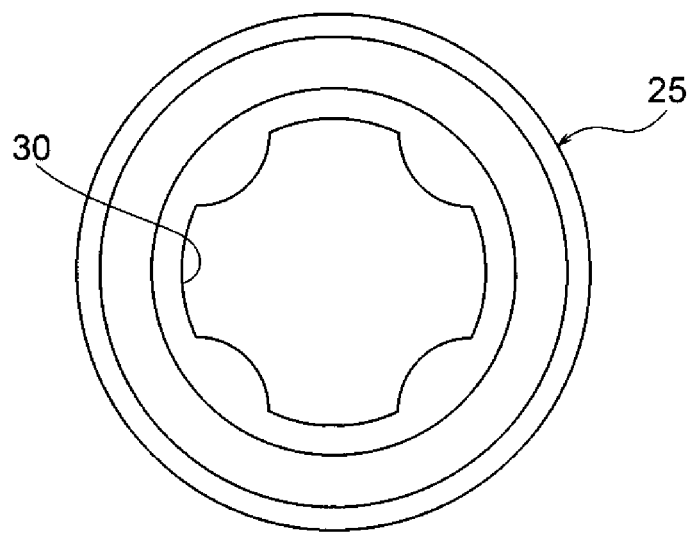
FIG. 3A is a view related to a die in FIG. 2.
Figure 3B:
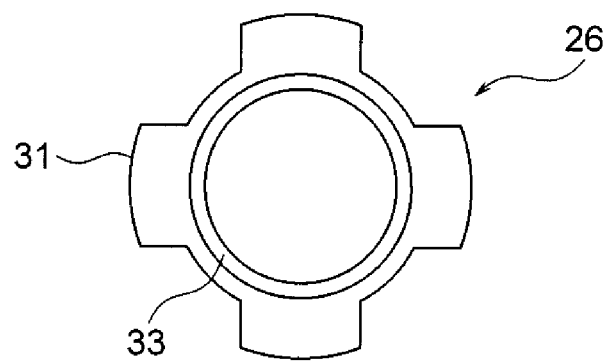
FIG. 3B is a view related to a nipple in FIG. 2.
Figure 3C:
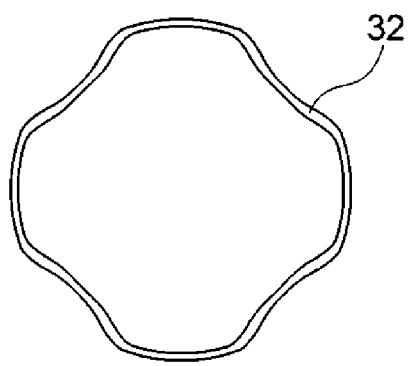
FIG. 3C is a view illustrating a resin flow path when the die and the nipple overlap each other (Example 1).

In FIGS. 2 and 3, the die 25 includes a through hole 30. Meanwhile, the nipple 26 is disposed to be positioned inside the through hole 30. A resin flow path 32 (refer to FIG. 3C) through which the melted resin material 22 passes is formed between the through hole 30 of the die 25 and an outer surface 31 of the nipple 26. A reference numeral "33" in the nipple 26 denotes a braid through hole with respect to the braid 5 (refer to FIGS. 1 and 2) supplied from the braid supplying unit 6.

<Operation of Rotation Head 4 and Continuous Projection Portion Forming Step>

In FIG. 2, if the motor 27 is driven such that the die 25 and the nipple 26 are rotated when the melted resin material 22 is extruded, the spiral projection portion 17 is formed. The spiral projection portion 17 is formed into a shape different from the shape of the bellows tube in the related art by adjusting the rotation speed of the die 25 and the nipple 26. That is, the spiral projection portion 17 is formed as a spiral-shaped flexible portion having an approximately bellows tube-like shape. Meanwhile, if the melted resin material 22 is extruded in a state where the die 25 and the nipple 26 are not rotated, the straight projection portion 18 is formed. The straight projection portion 18 is formed into a straight shape that extends in the tube axis direction since the die 25 and the nipple 26 are not rotated. Accordingly, the straight projection portion 18 is formed to function as a so-called reinforcement rib for securing rigidity. Since the straight projection portion 18 has such a shape and function, the straight projection portion 18 is formed as a useful portion of the straight tube portion 13.

<Summary and Effect of Invention>

As described above with reference to FIGS. 1 to 5, the exterior member 1 is formed into a tubular shape and the resin portion 10 thereof includes the flexible tube portions 12 that are flexible and the straight tube portions 13 of which the rigidity is higher than that of the flexible tube portions 12. In addition, the flexible tube portions 12 and the straight tube portions 13 are continuously formed. On the flexible tube portions 12 and the straight tube portions 13, the continuous projection portion 14 is formed and the continuous projection portion 14 is formed into a shape with the spiral projection portion 17 and the straight projection portion 18. The spiral projection portion 17 is formed into a shape in which the projection 16 spirally extends in the circumferential direction of the tube external surface 15 as seen from the tube external surface 15 side. Meanwhile, the straight projection portion 18 is formed into a shape that continuously extends from the end portion of the spiral projection portion 17 and extends in the tube axis direction.

According to the invention, the shape of the exterior member 1 has a characteristic and the shape having the characteristic does not degrade the original function of the exterior member 1 as understood from the above description. Therefore, it is possible to manufacture the exterior member 1 by using a device configuration different from that of the extrusion molding machine 102 (refer to FIGS. 20A and 20B) used in the related art. Specifically, it is possible to manufacture an exterior member by using a device configuration which is less expensive than that in the related art.

Therefore, according to the invention, it is possible to provide the exterior member 1 that can be manufactured at low cost, the wire harness 89 (refer to FIGS. 15A and 15B) that includes the exterior member 1, and a method of manufacturing the exterior member 1 at low cost.

In addition, according to the invention, since the spiral projection portion 17 is formed on the flexible tube portion 12, it is possible to make the flexible tube portion 12 be more likely to be bent than that in the related art (although there is no specific drawing or table being used, as a result of a test in accordance with JIS K 7171 (test conditions: inter-fulcrum distance=64 mm, push-in amount=1 mm), it was found that the three-point bending stress [N/mm] was 5.39 and 4.99 in the present invention while the three-point bending stress was 5.70 in the related art and it can be said that adoption of the invention results in a decrease in second moment of area and in the flexible tube portion being more likely to be bent).

In addition, according to the invention, since the braid 5 is disposed on the exterior member 1 side so that the exterior member 1 has a shielding function, it is possible to simplify a configuration and structure of the conduction path.

In addition, in a method in the related art, all of molds need to be replaced since a required length is different for each vehicle. However, according to the present invention, it is possible to switch only by controlling rotation as understood from the above description. In addition, as a result of this, it is possible to decrease the cost for molds and to decrease the number of processes for replacing molds. The same result can also be achieved in Example 2 or the like below.

Example 2

Figure 6:
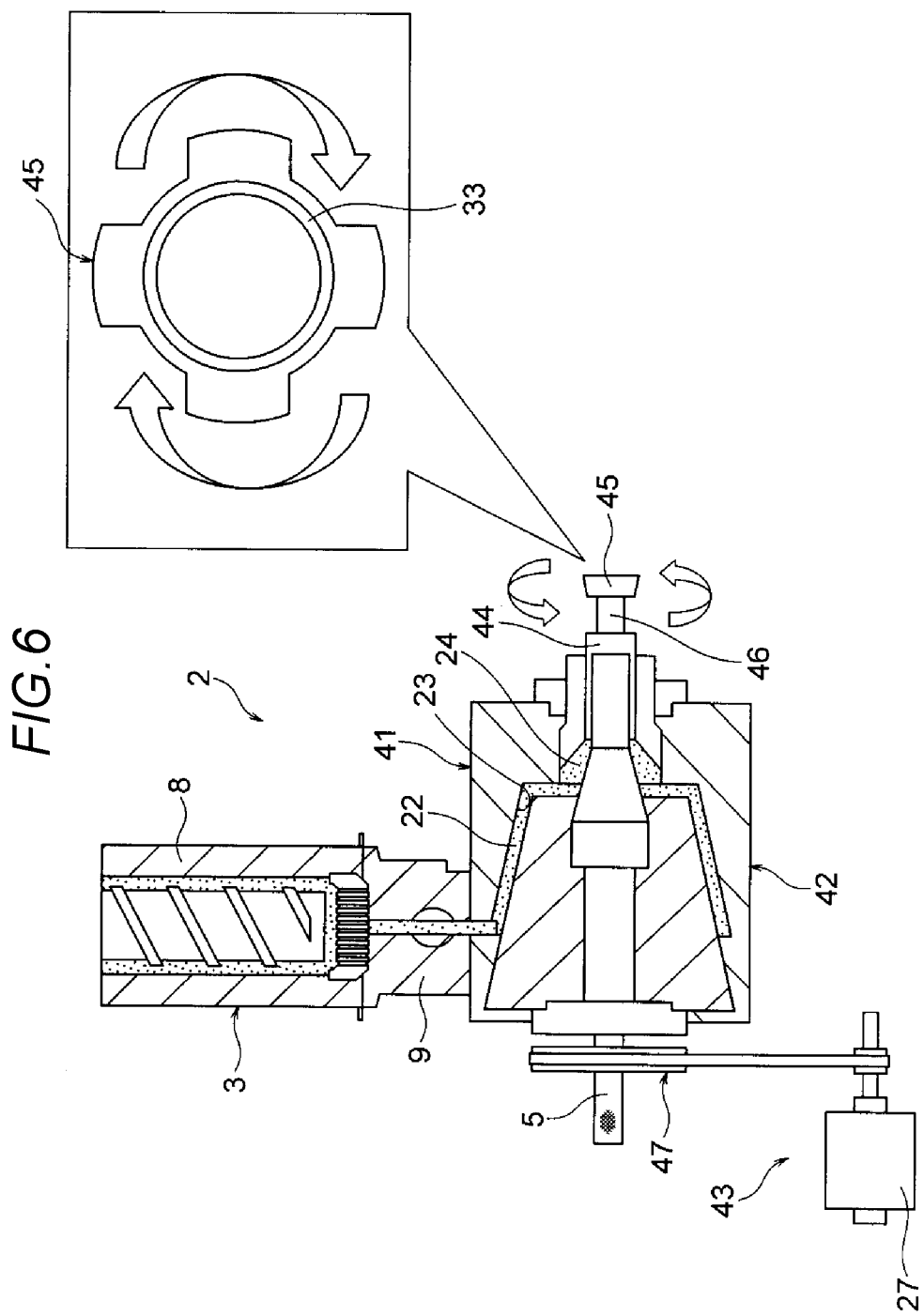
FIG. 6 is a schematic view illustrating a configuration of a rotation head in another example (Example 2).

Hereinafter, Example 2 will be described with reference to drawings. FIG. 6 is a schematic view illustrating a configuration of a rotation head in another example. Note that, components that are basically the same as those in Example 1 above will be given the same reference numerals and detailed description thereof will be omitted.

<Rotation Head 41 in Another Example>

In FIG. 6, a rotation head 41 in Example 2 is obtained by adding a rotation/driving mechanism to a so-called cross head as with Example 1 and is configured to include a rotation head main body 42 and a rotation/driving mechanism 43. The rotation head main body 42 is configured to include the resin material path 23 with respect to the melted resin material 22 (resin material), the resin material extrusion portion 24 at which the melted resin material 22 is extruded, a protrusion portion 45 that is disposed inside a tubular resin material 44 extruded from the resin material extrusion portion 24, and a mandrel 46 that is integrally formed with the protrusion portion 45. In addition, the rotation/driving mechanism 43 is configured to include the motor 27, a mandrel rotation mechanism 47 for rotating the mandrel 46 with the motor 27 being driven, and a controller (not shown) that controls the motor 27.

The protrusion portion 45 is formed into the same shape as the nipple 26 (refer to FIG. 3B) in Example 1. For the mandrel 46, a configuration of a known water cooling mandrel mechanism is used.

As understood from the above-described configuration, the rotation head 41 has a configuration and structure in which the continuous projection portion 14 (refer to FIGS. 4 and 5) is imparted with respect to the tubular resin material 44 from the inside thereof by using the rotatable protrusion portion 45 and the mandrel 46.

<Effect of Example 2>

As described above with reference FIG. 6, it is matter of course that Example 2 has the same effect as Example 1. That is, it is possible to provide the exterior member 1 (refer to FIG. 1B) that can be manufactured at low cost, the wire harness 89 (refer to FIGS. 14A to 14D) that includes the exterior member 1, and a method of manufacturing the exterior member 1 at low cost.

In addition, according to the invention, since the spiral projection portion 17 (refer to FIG. 1B) is formed on the flexible tube portion 12, it is possible to make the flexible tube portion 12 be more likely to be bent than that in the related art. In addition, according to the invention, since the braid 5 is disposed on the exterior member 1 (refer to FIG. 1B) side so that the exterior member 1 has a shielding function, it is possible to simplify a configuration and structure of the conduction path.

Example 3

Hereinafter, Example 3 will be described with reference to drawings. FIGS. 7A and 7B are schematic views illustrating a configuration of a rotation head in still another example. Note that, components that are basically the same as those in Examples 1 and 2 above will be given the same reference numerals and detailed description thereof will be omitted.

<Rotation Head 51 in Still Another Example>

In FIGS. 7A and 7B, a rotation head 51 in Example 3 is obtained by adding a rotation/driving mechanism to a so-called cross head as with Examples 1 and 2 and is configured to include a rotation head main body 52 and a rotation/driving mechanism 53. The rotation head main body 52 is configured to include the resin material path 23 with respect to the melted resin material 22 (resin material), the resin material extrusion portion 24 at which the melted resin material 22 is extruded, a die 54 that is disposed outside a tubular resin material extruded from the resin material extrusion portion 24, and the mandrel 46. In addition, the rotation/driving mechanism 53 is configured to include the motor 27, a die rotation mechanism 55 for rotating the die 54 with the motor 27 being driven, and a controller (not shown) that controls the motor 27.

The die 54 is formed into the same shape as the die 25 (refer to FIG. 3A) in Example 1. For the mandrel 46, a configuration of the same water cooling mandrel mechanism as in Example 2 is used.

As understood from the above-described configuration, the rotation head 51 has a configuration and structure in which the continuous projection portion 14 (refer to FIGS. 4 and 5) is imparted with respect to the tubular resin material 44 from the outside thereof by using the rotatable die 54 and the mandrel 46.

<Effect of Example 3>

As described above with reference FIGS. 7A and 7B, it is matter of course that Example 3 has the same effect as Examples 1 and 2. That is, it is possible to provide the exterior member 1 that can be manufactured at low cost, the wire harness 89 (refer to FIGS. 15A and 15B) that includes the exterior member 1, and a method of manufacturing the exterior member 1 at low cost.

In addition, according to the invention, since the spiral projection portion 17 is formed on the flexible tube portion 12, it is possible to make the flexible tube portion 12 be more likely to be bent than that in the related art. In addition, according to the invention, since the braid 5 is disposed on the exterior member 1 side so that the exterior member 1 has a shielding function, it is possible to simplify a configuration and structure of the conduction path.

Example 4

Figure 9A:
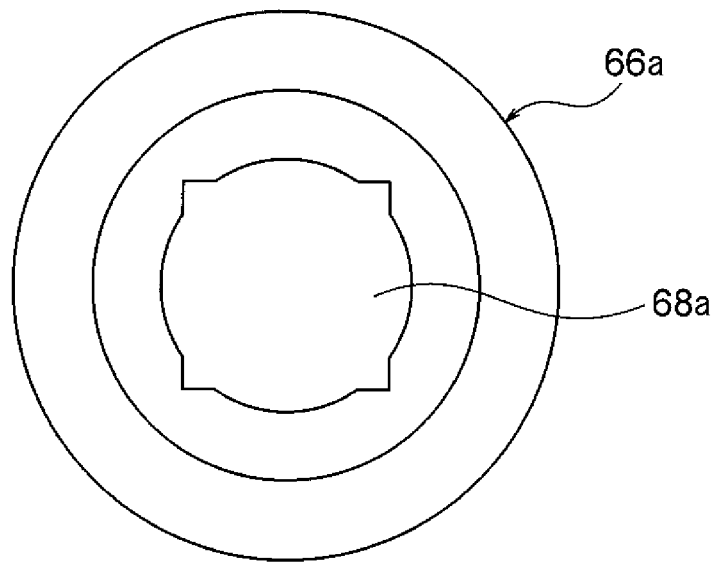
FIG. 9A is a view illustrating another example of a ribbed die in FIG. 8.
Figure 9B:
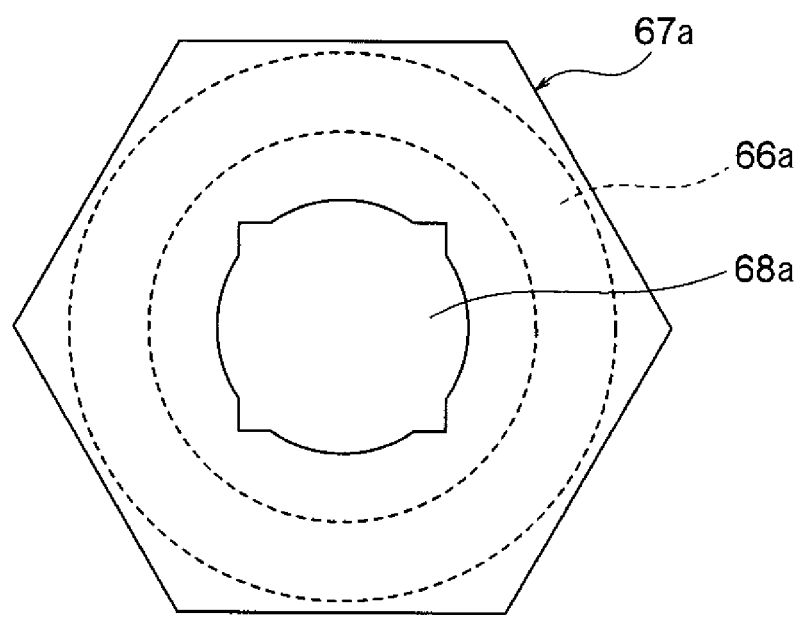
FIG. 9B is a view illustrating another example of a rotatory disk (Example 4).

Hereinafter, Example 4 will be described with reference to drawings. FIG. 8 is a schematic view illustrating a configuration of a rotation head in still another example. In addition, FIG. 9A is a view illustrating another example of a ribbed die in FIG. 8 and FIG. 9B is a view illustrating another example of a rotatory disk. Note that, components that are basically the same as those in Examples 1 to 3 above will be given the same reference numerals and detailed description thereof will be omitted.

<Rotation Head 61 and Exterior Member 1 in Still Another Example>

In FIG. 8, a rotation head 61 in Example 4 is obtained by adding a rotation/driving mechanism to a so-called cross head as with Examples 1 to 3. However, the exterior member 1 that is formed through resin molding using the rotation head 61 is different in formation of the flexible tube portion 12 and the straight tube portion 13 as follows. That is, the flexible tube portion 12 and the straight tube portion 13 in Example 4 form an intermittent projection portion 62 while the flexible tube portion 12 and the straight tube portion 13 in Examples 1 to 3 form the continuous projection portion 14.

First, the intermittent projection portion 62 of the exterior member 1 in Example 4 will be described and the rotation head 61 will be described thereafter.

<Intermittent Projection Portion 62 of Exterior Member 1 in Example 4>

The intermittent projection portion 62 is formed into a shape that includes a non-projecting portion 63 in which the projection 16 is not present as seen from the tube outer surface 15 side and projecting portions 64 in which the projection 16 extends in the tube axis direction. Regarding the exterior member 1, the non-projecting portion 63 corresponds to the flexible tube portion 12 and the projecting portion 64 corresponds to the straight tube portion 13. The projecting portion 64 is formed such that, for example, a plurality of projections 16 are present at pitch of 90 degrees. Each projection 16 in the projecting portion 64 is formed to function as a so-called reinforcement rib for securing rigidity (in Example 4, the projection 16 functions as a reinforcement rib but the invention is not limited to this in Example 8 below).

<Rotation Head 61 in Example 4>

The rotation head 61 is configured to include a rotation head main body 65 and a rotation/driving mechanism (not shown). The rotation head main body 65 is configured to include the resin material path 23 with respect to the melted resin material 22 (resin material), the resin material extrusion portion 24 at which the melted resin material 22 is extruded, a ribbed die 66 that 67 is disposed at a position on the downstream side of the resin material extrusion portion 24, and a rotatory disk that is rotatably installed at a position on the downstream side of the ribbed die 66. In addition, the rotation/driving mechanism (not shown) is configured to include a mechanism section for rotating the rotatory disk 67 by a predetermined angle, a driving section for driving the mechanism section, and a controller for controlling the driving section.

A through hole 68 is formed in the ribbed die 66. The through hole 68 is formed into a shape such that the projection 16 can be formed. Meanwhile, the same through hole 68 is formed in the rotatory disk 67 also. In Example 4, the rotatory disk 67 is rotated by a predetermined angle with respect to the ribbed die 66 and when the shapes of the through holes 68 coincide with each other, the projection 16 is formed.

The shapes of the ribbed die 66 and the rotatory disk 67 are not limited to shapes illustrated in FIG. 8 and may be changed to shapes illustrated in FIGS. 9A and 9B, for example. That is, the ribbed die 66 and the rotatory disk 67 may be changed to a ribbed die 66a and a rotatory disk 67a such that ribs slightly protrude from the tube outer surface of the exterior member (broken lines in FIG. 9B denote the ribbed die 66a and in this drawing, the shapes of through holes 68a coincide with each other.).

<Operation of Rotation Head 61 and Intermittent Projection Portion Forming Step>

In FIG. 8, if the rotatory disk 67 is rotated by a predetermined angle such that the shapes of the through holes 68 of the ribbed die 66 and the rotatory disk 67 coincide with each other when the melted resin material 22 is extruded, the projecting portion 64 corresponding to the straight tube portion 13 is formed. Meanwhile, if the shapes of the through holes 68 do not coincide with each other, the non-projecting portion 63 corresponding to the flexible tube portion 12 is formed.

<Summary and Effect of Invention>

As described above with reference to FIGS. 8 and 9, the exterior member 1 is formed into a tubular shape and the resin portion thereof includes the flexible tube portions 12 that are flexible and the straight tube portions 13 of which the rigidity is higher than that of the flexible tube portions 12. In addition, the flexible tube portions 12 and the straight tube portions 13 are continuously formed. On the flexible tube portions 12 and the straight tube portions 13, the intermittent projection portion 62 is formed and the intermittent projection portion 62 is formed into a shape with the non-projecting portion 63 and the projecting portion 64. Regarding the exterior member 1, the non-projecting portion 63 corresponds to the flexible tube portion 12 and the projecting portion 64 corresponds to the straight tube portion 13. The intermittent projection portion 62 is formed into a shape in which the projection 16 is intermittently present as seen from the tube external surface 15 side.

<Effect of Example 4>

According to the invention, the shape of the exterior member 1 has a characteristic and the shape having the characteristic does not degrade the original function of the exterior member 1. Therefore, it is possible to manufacture the exterior member 1 by using a device configuration different from that of the extrusion molding machine 102 (refer to FIGS. 20A and 20B) used in the related art. Specifically, it is possible to manufacture an exterior member by using a device configuration which is less expensive than that in the related art.

Therefore, according to the invention, it is possible to provide the exterior member 1 that can be manufactured at low cost, the wire harness 89 (refer to FIGS. 15A and 15B) that includes the exterior member 1, and a method of manufacturing the exterior member 1 at low cost. In addition, according to the invention, since the braid 5 is disposed on the exterior member 1 side so that the exterior member 1 has a shielding function, it is possible to simplify a configuration and structure of the conduction path.

Example 5

Figure 10A:
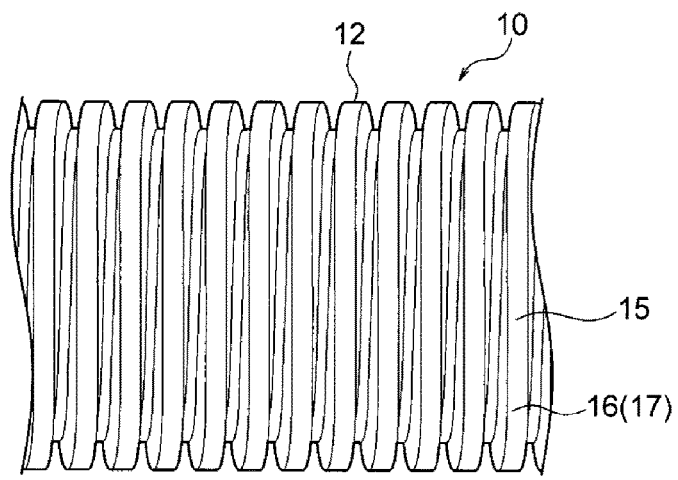
FIGS. 10A to 10C are views of a flexible tube portion in the exterior member.
Figure 10B:
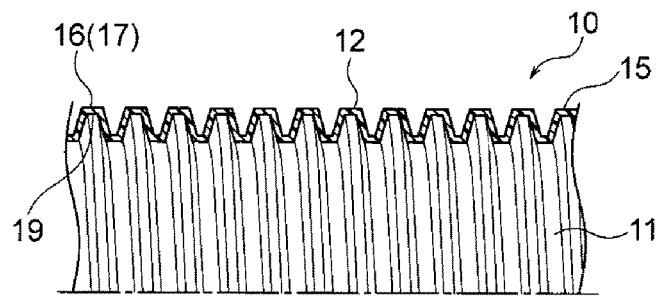
Figure 10C:
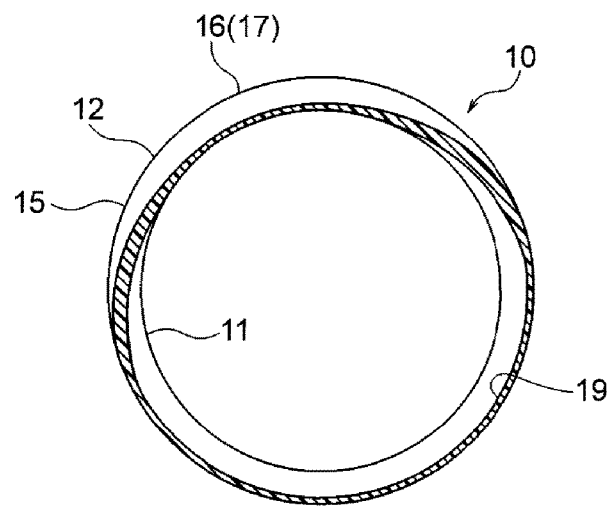

Hereinafter, Example 5 will be described with reference to drawings. FIGS. 10 to 13 are views of the flexible tube portion in the exterior member. FIG. 10A is an external view and FIGS. 10B and 10C are sectional views. The same applies to FIGS. 12A to 12C and 13A to 13C. Note that, components that are basically the same as those in Example 1 above will be given the same reference numerals and detailed description thereof will be omitted.

Figure 11A:
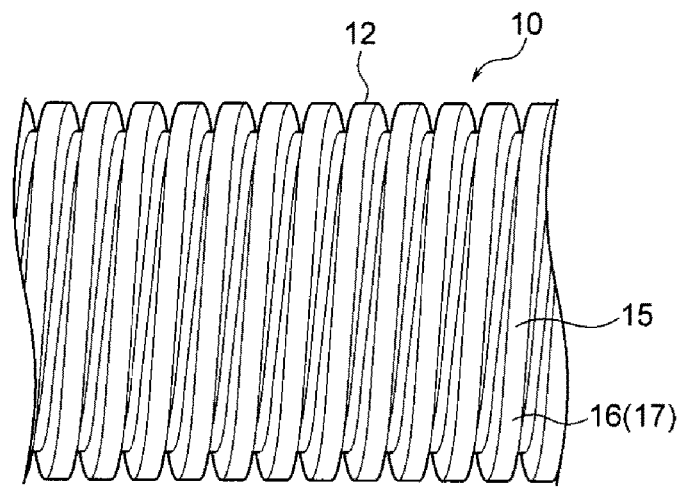
FIGS. 11A to 11C are views of the flexible tube portion in the exterior member.
Figure 11B:
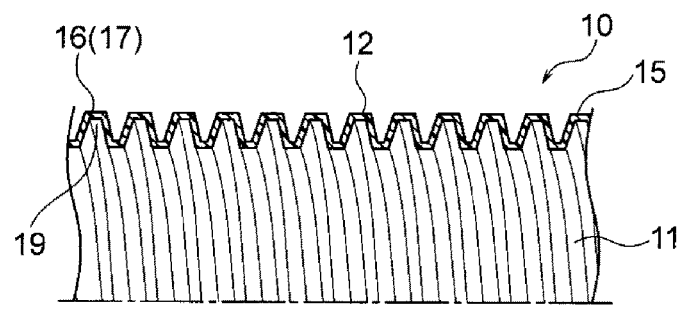
Figure 11C:
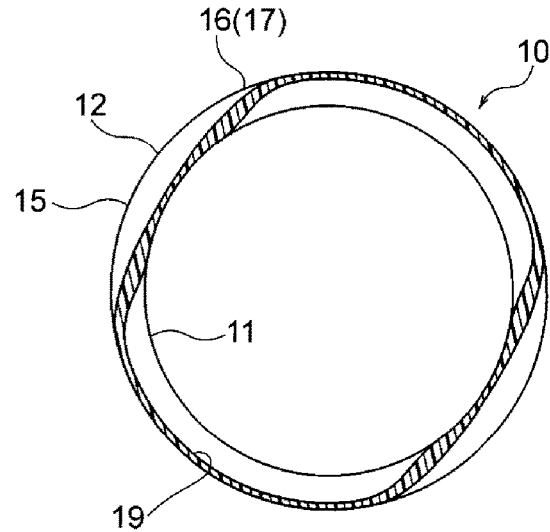
Figure 12A:
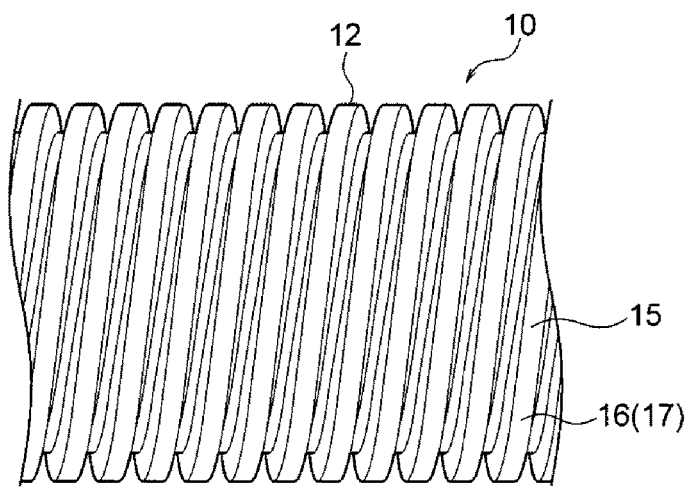
FIGS. 12A to 12C are views of the flexible tube portion in the exterior member.
Figure 12B:
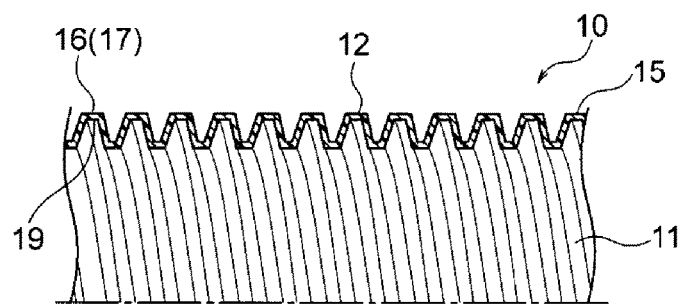
Figure 12C:
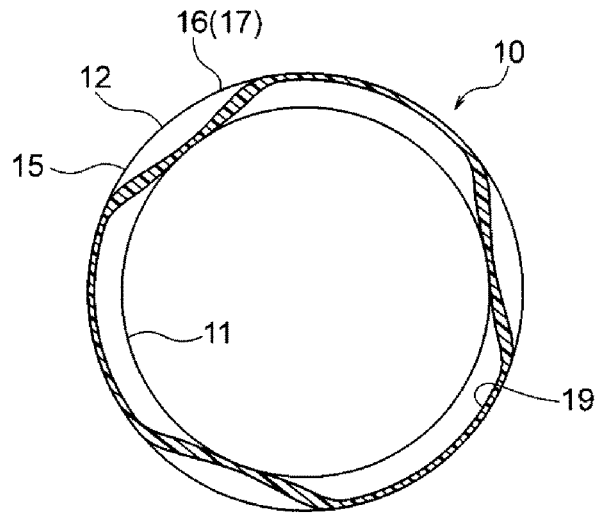
Figure 13C:
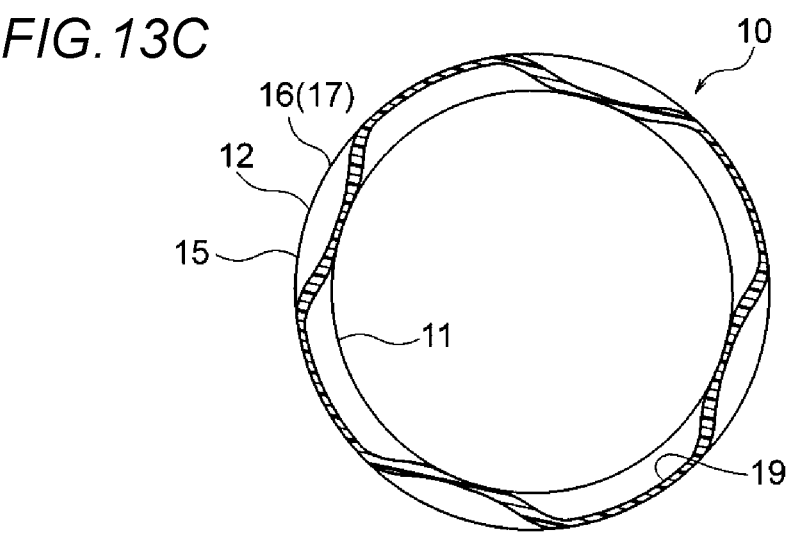

In FIGS. 10A to 13C, Example 5 illustrates how a change in shape of a die and a nipple changes a spiral state of the spiral projection portion 17. FIGS. 13A to 13C have the same shape as in Example 1. In the invention, in addition to a shape in FIGS. 13A to 13C, the shape of the spiral projection portion 17 in FIGS. 10 to 12 is also effective.

Regarding the flexible tube portion 12 described so far, a method which is particularly effective for forming the spiral projection portion 17 will be described below as Example 6 (a method different from that in the above description).

Example 6

Figure 14A:
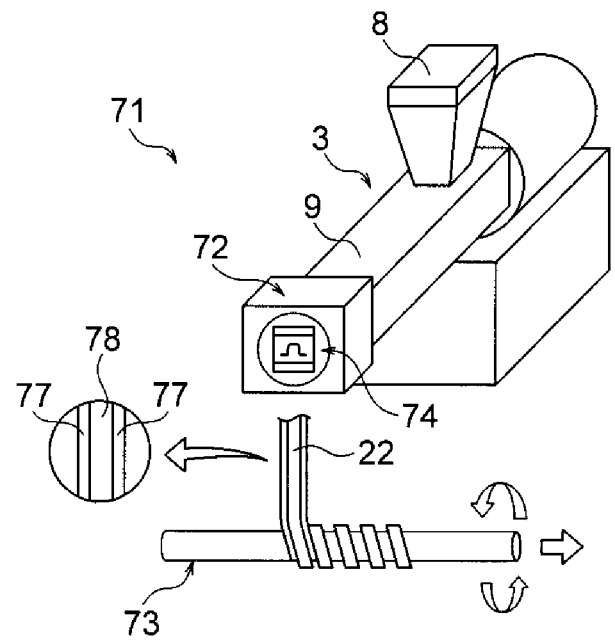
FIGS. 14A to 14D are views illustrating another example related to formation of a spiral projection portion.
Figure 14B:
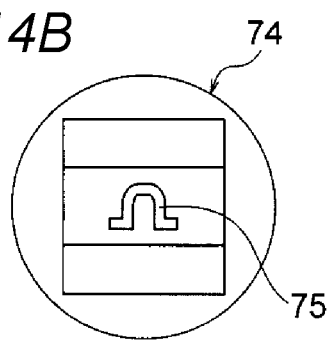
Figure 14C:
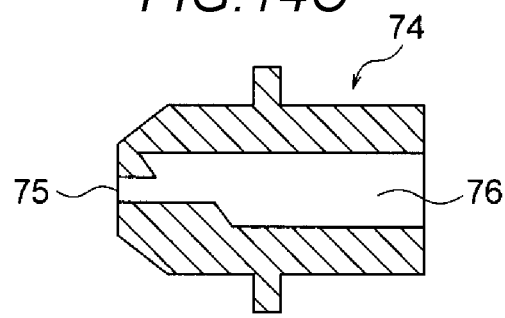
Figure 14D:
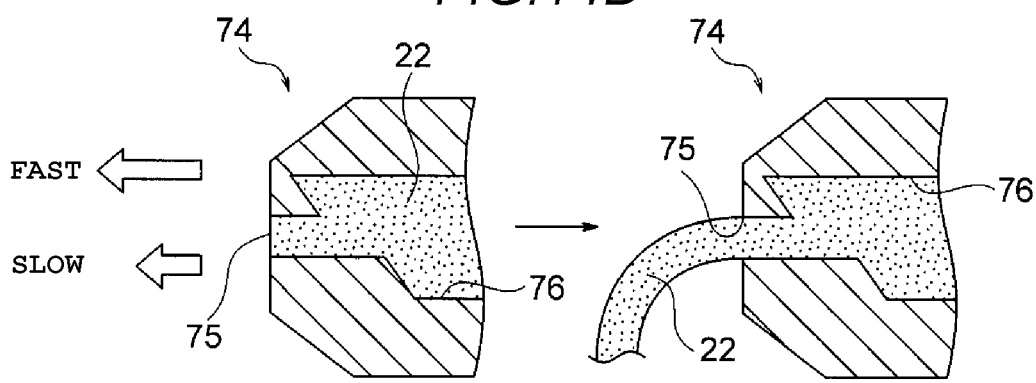

Example 6 will be described with reference to drawings. FIGS. 14A to 14D are views illustrating another example related to formation of the spiral projection portion. FIG. 14A is a schematic view illustrating a configuration of the extrusion molding machine, FIG. 14B is a front view of the die, FIG. 14C is a sectional view of the die, and FIG. 14D is a view illustrating a state where melted resin is extruded from the die. Note that, components that are basically the same as those in Example 1 above will be given the same reference numerals and detailed description thereof will be omitted.

<Overview of Configuration of Extrusion Molding Machine 71>

In FIG. 14A, an extrusion molding machine 71 includes the resin extruding unit 3, a die holding unit 72 that is integrally provided while being positioned on the downstream side of the resin extruding unit 3 and a rotational winding mechanism 73. The die holding unit 72 holds a die 74.

<Die 74 and Rotational Winding Mechanism 73>

In FIGS. 14A to 14D, a resin flow path 75 that matches the sectional shape of the spiral projection portion 17 is formed in an end portion of the die 74. The resin flow path 75 is formed to continuously extend from a flow path main body 76 in the die 74. The land length of the flow path main body 76 is adjusted such that the die 74 is formed into a shape in which there is a difference in resin flow rate at the resin flow path 75 (at the position of an end portion). When there is a difference in resin flow rate in the die 74 as illustrated by arrows in FIG. 14D, the melted resin material 22 is extruded being naturally curved downwards. Valley portions 77 (a reference numeral "78" denotes a mountain portion) of the melted resin material 22 extruded from the die 74 overlap each other in a half-melted state due to the rotational winding mechanism 73. As a result, the spiral projection portion 17 is formed as winding progresses. The rotational winding mechanism 73 is configured such that the spiral projection portion 17 can be formed by winding the melted resin material 22 on the outer circumferential portion of a rod-shaped portion or a cylindrical portion of the rotational winding mechanism or on the outer circumferential portion of a tubular braid. When such a method in this example is adopted, the spiral projection portion 17 is formed while the winding is performed without forcible pulling.

Example 7

Hereinafter, Example 7 will be described with reference to drawings. FIGS. 15A and 15B are views illustrating a wire harness of the invention. FIG. 15A is a schematic view illustrating a routing state of the wire harness and FIG. 15B is a view illustrating a configuration of the wire harness. Note that, components that are basically the same as those in Example 1 above will be given the same reference numerals and detailed description thereof will be omitted.
<Configuration of Hybrid Automobile 81>

In FIG. 15A, a reference numeral "81" denotes a hybrid automobile. The hybrid automobile 81 is a vehicle driven by a mixture of two driving forces from an engine 82 and a motor unit 83 and power from a battery 85 (a battery pack) is supplied to the motor unit 83 via an inverter unit 84. The engine 82, the motor unit 83, and the inverter unit 84 are built into an engine room 86 in a position at which front wheels and the like are present in this example. In addition, the battery 85 is built into an automobile rear portion 87 in which rear wheels and the like are present (may be built into an automobile chamber present behind the engine room 86).

The motor unit 83 and the inverter unit 84 are connected to each other via a high-voltage motor cable 88. In addition, the battery 85 and the inverter unit 84 are connected to each other via the high-voltage wire harness 89. The wire harness 89 is related to the invention and an intermediate portion 90 thereof is routed on the vehicle underfloor portion 91 of the vehicle (the vehicle body). In addition, the intermediate portion 90 is routed approximately horizontally along the vehicle underfloor portion 91. The vehicle underfloor portion 91 is a known body (the vehicle body), is a so-called panel member, and includes a through hole formed at a predetermined position. The wire harness 89 is water-tightly inserted into the through hole.

The wire harness 89 and the battery 85 are connected to each other via a junction block 92 provided in the battery 85. External connecting means such as a shield connector 94 that is disposed with respect to a harness terminal 93 on the rear end side of the wire harness 89 is electrically connected to the junction block 92. In addition, the wire harness 89 and the inverter unit 84 are electrically connected to each other via external connecting means such as a shield connector 94 disposed with respect to a harness terminal 93 on the front end side.

The motor unit 83 is configured to include a motor and a generator. In addition, the inverter unit 84 is configured to include an inverter and a converter. The motor unit 83 is formed as a motor assembly including a shield case. In addition, the inverter unit 84 is formed as an inverter assembly including a shield case. The battery 85 is a Ni-MH type battery or a Li-ion type battery, and is formed through modularization. Note that, an electrical storage device such as a capacitor can also be used. It is matter of course that the battery 85 is not particularly limited as long as the battery 85 can be used in the hybrid automobile 81 or in an electric automobile.
<Configuration of Wire Harness 89>

In FIG. 15B, the elongated wire harness 89 that is routed through the vehicle underfloor portion 91 (refer to FIG. 15A)) is configured to include two conduction paths 95 (the number of conduction paths is merely an example) and the exterior member 1 in the invention for accommodating and protecting the conduction paths 95.
<Configuration and Structure of Conduction Path 95>

The conduction path 95 is configured to include a conductive conductor and an insulating insulator that covers the conductor. The conductor is made of copper, copper alloy, aluminum, or aluminum alloy and has a circular section. The conductor may have any of a conductor structure obtained by twisting wires and a rod-shaped conductor structure (for example, a conductor structure with a rectangular single core or a circular single core and in this case, the electric wire itself also has a rod shape) having a rectangular or circular (round) section. The insulator made of insulating resin material is formed on an outer surface of the conductor as described above through extrusion molding.

The insulator is formed on an outer circumferential surface of the conductor through extrusion molding using thermoplastics resin material. The insulator is formed as a coating having a circular section. The insulator is formed to have a predetermined thickness. As the thermoplastics resin, known various types of thermoplastics resin can be used and is appropriately selected from polymer materials such as polyvinyl chloride resin, polyethylene resin, polypropylene resin and the like.
<Effect of Wire Harness 89>

Since the wire harness 89 includes the exterior member 1 of the invention, the wire harness 89 can be manufactured at low cost. In addition, according to the invention, it is possible to provide a more favorable wire harness 89.

Example 8

Figure 17:
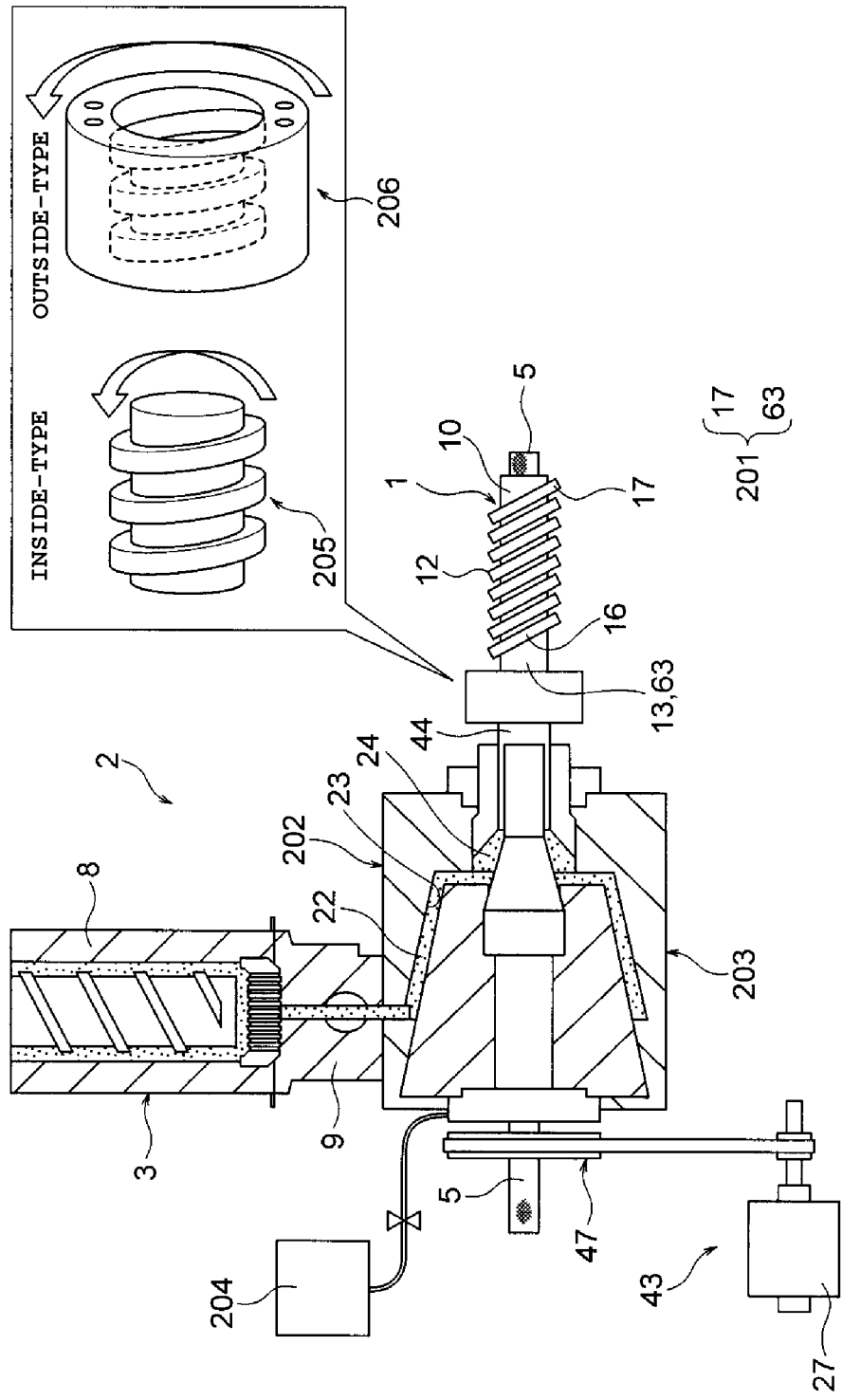
FIG. 17 is a schematic view illustrating a configuration of the extrusion molding machine (Example 8).
Figure 18A:
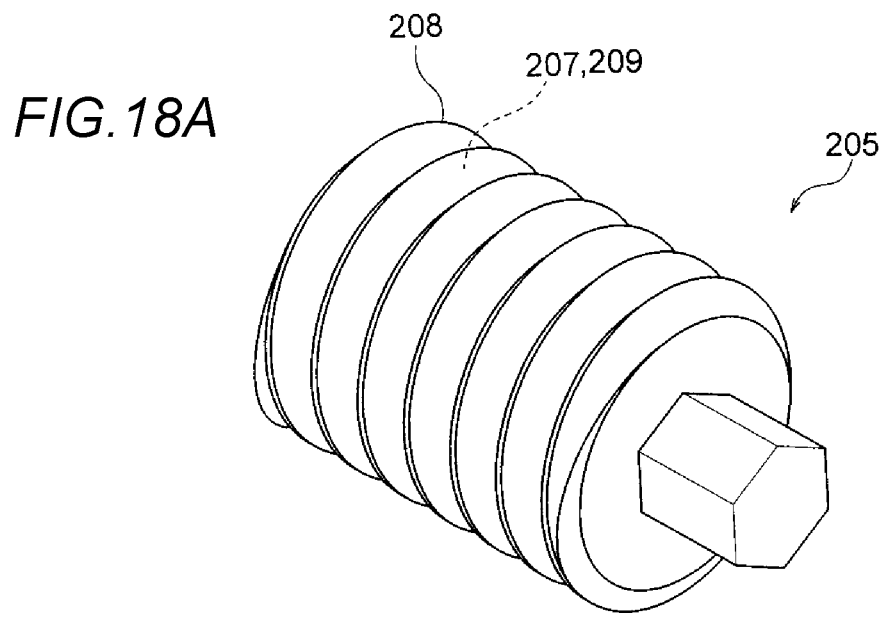
FIG. 18A is a perspective view of an inside-type mandrel and FIG. 18B is a side view of the inside-type mandrel (Example 8).
Figure 18B:
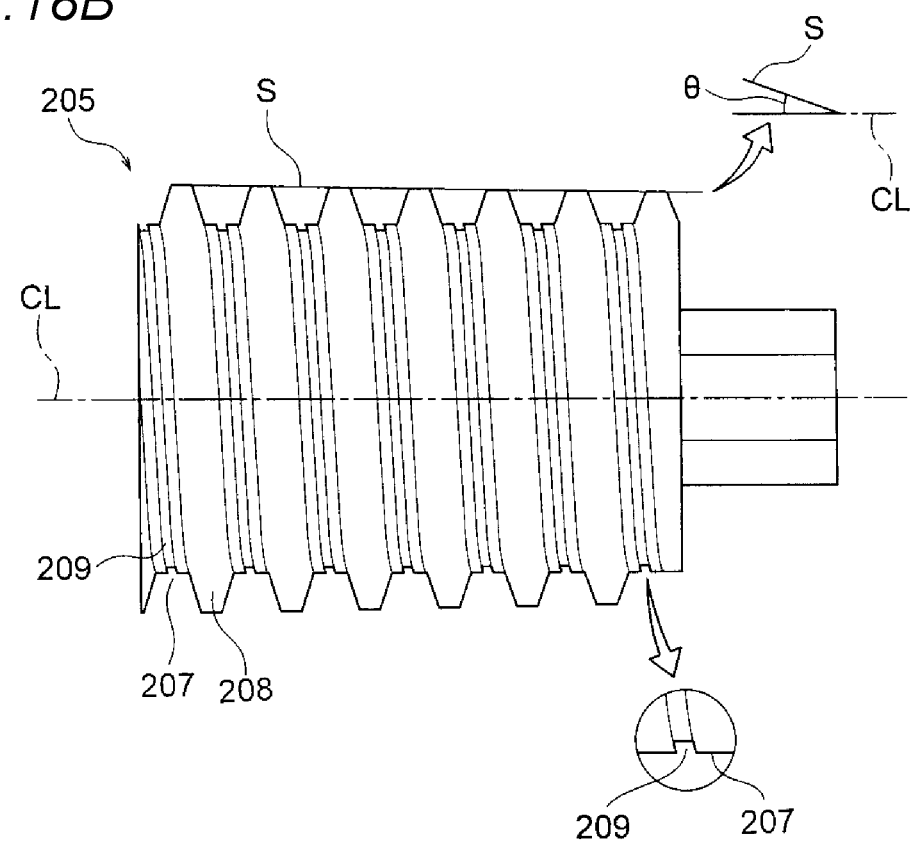
Figure 19:
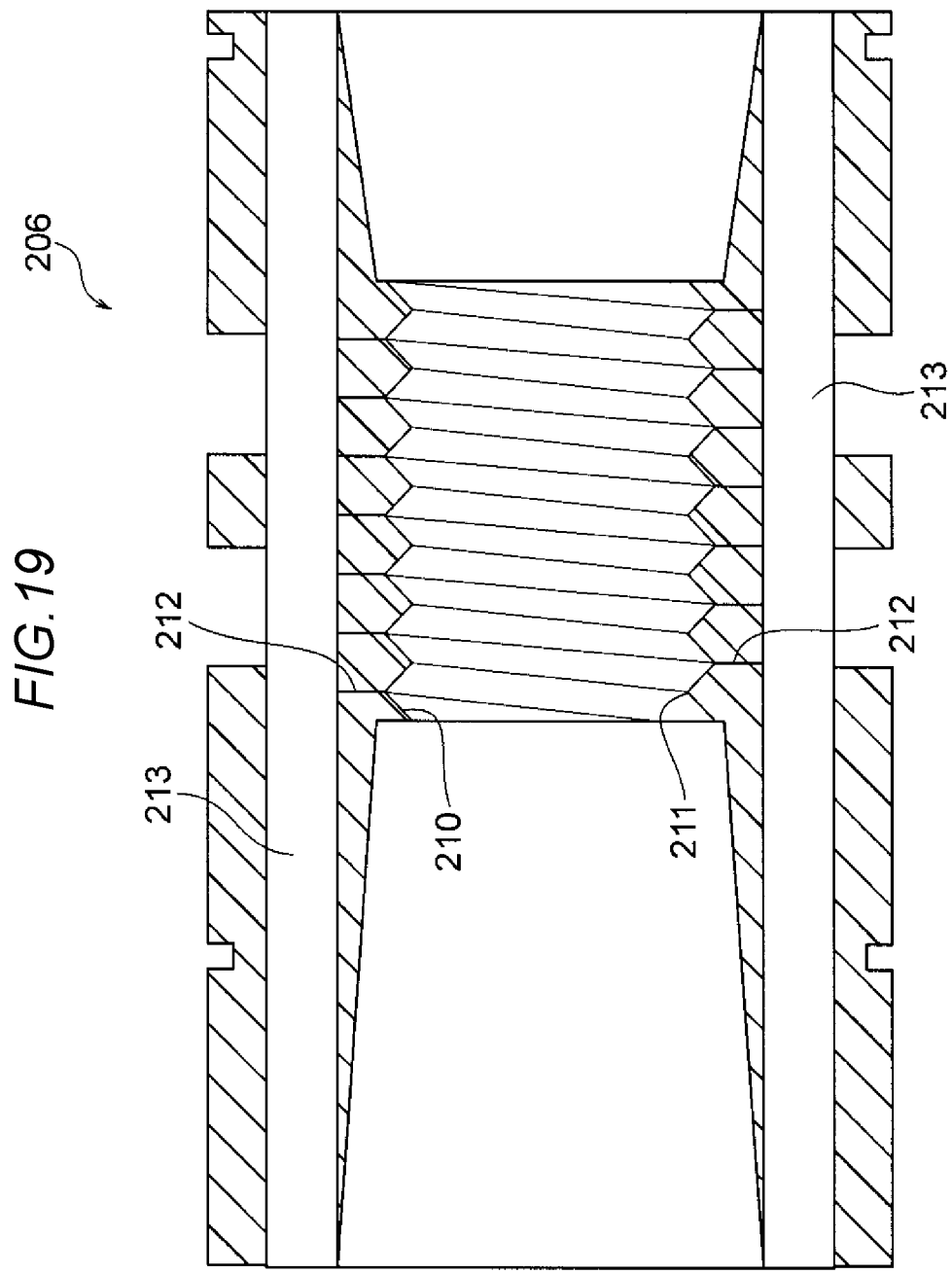
FIG. 19 is a sectional view of an outside-type mandrel (Example 8).

Hereinafter, Example 8 will be described with reference to drawings. FIG. 16 is a view illustrating a configuration of the exterior member. In addition, FIG. 17 is a schematic view illustrating a configuration of the extrusion molding machine, FIGS. 18A and 18B are views of an inside-type mandrel, FIG. 18A is a perspective view, FIG. 18B is a side view and FIG. 19 is a sectional view of an outside-type mandrel. Note that, components that are basically the same as those in Examples 1 to 7 above will be given the same reference numerals and detailed description thereof will be omitted.
<Exterior Member 1>

In FIG. 16, the exterior member 1 in Example 8 is configured to include the resin portion 10 that is formed into a tubular shape and the braid 5 that is disposed on the tube inner surface 11 side of the resin portion 10. The resin portion 10 of the exterior member 1 is formed into one straight tubular shape through resin molding (the resin portion 10 has a straight shape immediately after the exterior member 1 is molded and before the exterior member 1 is used). In addition, the exterior member 1 is formed into a shape without cuts. In other words, the exterior member 1 is formed into a shape without slits (is formed into a shape other than a divided tube-like shape).

The exterior member 1 as described above includes the flexible tube portions 12 that are flexible and the straight tube portions 13 for linearly routing the conduction path 95 (refer to FIGS. 15A and 15B), which will be described later. The plurality of flexible tube portions 12 and straight tube portions 13 are formed. In addition, the flexible tube portions 12 and the straight tube portions 13 are formed to be alternately disposed in the tube axis direction. Each flexible tube portion 12 includes the projection 16 and the projection 16 is formed as the spiral projection portion 17 in an intermittent projection portion 201. Meanwhile, the straight tube portion 13 is formed as the non-projecting portion 63 in the intermittent projection portion 201.

The resin portion 10 in Example 8 is formed into a shape including the spiral projection portion 17 and the non-projecting portion 63 as illustrated in the drawing. That is, the resin portion 10 is formed into a shape including the intermittent projection portion 201 as illustrated in the drawing.

The resin portion 10 in Example 8 is formed into a shape in which the flexible tube portion 12, on which the spiral projection portion 17 is formed, is flexible and the straight tube portion 13, on which the non-projecting portion 63 is formed, secures rigidity. Therefore, it can be found that the resin portion 10 has a different shape from the intermittent projection portion 62 (refer to FIG. 8) in Example 4. Specifically, for example, the non-projecting portion 63 in the present embodiment can be formed such that the tube wall thickness thereof becomes larger than the tube wall thickness of the non-projecting portion 63 in Example 4.

<Extrusion Molding Machine 2>

In FIG. 17, the extrusion molding machine 2 for resin molding of the exterior member 1 includes the resin extruding unit 3 that includes the hopper 8 and the extruding unit main body 9, a rotation head 202 that is integrally provided while being positioned on the downstream side of the resin extruding unit 3, a braid supplying unit (not shown) that supplies the braid 5 (a shield member) to the rotation head 202, a cooling water tank (not shown) that is disposed separately while being positioned on the downstream side of the rotation head 202, and a cutting unit (not shown) that is disposed separately from while being positioned on the downstream side of the cooling water tank.

The rotation head 202 is configured to include a rotation head main body 203, the rotation/driving mechanism 43, and a vacuum pump 204. The rotation head main body 203 is configured to include the resin material path 23 with respect to the melted resin material 22 (resin material), the resin material extrusion portion 24 at which the melted resin material 22 is extruded, and an inside-type mandrel 205 that is disposed to be positioned inside the tubular resin material 44 extruded from the resin material extrusion portion 24 (or an outside-type mandrel 206 that is disposed to be positioned outside the tubular resin material 44). The rotation/driving mechanism 43 is configured to include the motor 27 and a controller (not shown) that controls the motor 27.

The rotation head 202 has a configuration and structure such that the spiral projection portion 17 of the intermittent projection portion 201 can be formed with respect to the tubular resin material 44 from the inside or outside of the tubular resin material 44 by means of the rotatable inside-type mandrel 205 or the outside-type mandrel 206 and the vacuum pump 204.

<Inside-Type Mandrel 205>

In FIGS. 17 and 18, the inside-type mandrel 205 is formed to have a screw-like shape as illustrated in the drawings. A spiral recess portion 207 and a projection portion 208 are formed on an outer circumferential surface of the inside-type mandrel 205. In addition, a small groove 209 is formed in the bottom of the recess portion 207. The small groove 209 is formed as a portion for maintaining a suction effect, which occurs when the vacuum pump 204 is operated, up to a projection tip end of the spiral projection portion 17 (refer to FIG. 16). Since the small groove 209 is formed, fluctuation in suctioning effect is suppressed and the shape is stabilized.

In FIG. 18B, the inside-type mandrel 205 is formed such that the height of the projecting shape of the projection portion 208 decreases toward the right side from the left side in the drawing. Specifically, the inside-type mandrel 205 is formed such that an angle θ formed between a central line CL and an inclined line S is, for example, 1° to 2°. Therefore, it is possible to decrease friction between the inside-type mandrel 205 and resin (the tubular resin material 44).

<Outside-Type Mandrel 206>

In FIGS. 17 and 19, the outside-type mandrel 206 is formed to have a tubular shape as illustrated in the drawings. A spiral recess portion 210 and a projection portion 211 are formed on an inner circumferential surface of the outside-type mandrel 206. In addition, a small slit 212 is formed in the bottom of the recess portion 210. The small slit 212 is formed to communicate with a suction path 213. The small slit 212 is formed as a portion for maintaining a suction effect, which occurs when the vacuum pump 204 is operated, up to a projection tip end of the spiral projection portion 17 (refer to FIG. 16). Since the small slit 212 is formed, fluctuation in suctioning effect is suppressed and the shape is stabilized.

<Operation of Rotation Head 202 and Intermittent Projection Portion Forming Step>

In FIG. 17, when the melted resin material 22 is extruded, the tubular resin material 44 is molded, and pressure reduction is performed from the inside or outside of the tubular resin material 44, the tubular resin material 44 is suctioned toward the recess portion 207 and the projection portion 208 of the inside-type mandrel 205 or toward the recess portion 210 and the projection portion 211 of the outside-type mandrel 206. As a result, the spiral projection portion 17 is formed. Since the inside-type mandrel 205 and the outside-type mandrel 206 is rotated by the rotation/driving mechanism 43, a molded product is fed forwards and thus the projection 16 that continues in an extrusion direction is spirally formed. When the melted resin material 22 is extruded and the tubular resin material 44 is molded while stopping reduced pressure suction, the non-projecting portion 63 is formed. The intermittent projection portion forming step is a step in which the intermittent projection portion 201 is formed by switching pressure reduction and stoppage during resin molding.

<Summary and Effect of Invention>

As described above with reference to FIGS. 16 to 19, the exterior member 1 is formed into a tubular shape and the resin portion thereof includes the flexible tube portions 12 that are flexible and the straight tube portions 13 of which the rigidity is higher than that of the flexible tube portions 12. In addition, the flexible tube portions 12 and the straight tube portions 13 are continuously formed. On the flexible tube portions 12 and the straight tube portions 13, the intermittent projection portion 201 is formed and the intermittent projection portion 201 is formed into a shape with the spiral projection portion 17 and the non-projecting portion 63. The intermittent projection portion 201 is formed into a shape in which the projection 16 is intermittently present as seen from the tube external surface 15 side.

<Effect of Example 8>

According to the invention, the shape of the exterior member 1 has a characteristic and the shape having the characteristic does not degrade the original function of the exterior member 1. Therefore, it is possible to manufacture the exterior member 1 by using a device configuration different from that of the extrusion molding machine 102 (refer to FIGS. 20A and 20B) used in the related art. Specifically, it is possible to manufacture an exterior member by using a device configuration which is less expensive than that in the related art.

Therefore, according to the invention, it is possible to provide the exterior member 1 that can be manufactured at low cost, the wire harness 89 (refer to FIGS. 15A and 15B) that includes the exterior member 1, and a method of manufacturing the exterior member 1 at low cost. In addition, according to the invention, since the braid 5 is disposed on the exterior member 1 side so that the exterior member 1 has a shielding function, it is possible to simplify a configuration and structure of the conduction path.

The invention is not limited to the above-described embodiments and various modification examples can be adopted within the scope of the invention.

Here, characteristics of the above-described embodiments of an exterior member, a wire harness, and a manufacturing method of an exterior member according to the invention will be briefly and collectively listed in following (1) to (6).

An exterior member (1) having a tubular shape so as to accommodate and protect one conduction path (95) or a plurality of conduction paths (95) comprising;

a resin portion (10), wherein the resin portion (10) includes a flexible tube portion (12) having flexibility and a straight tube portion (13) so as to linearly route the conduction path, wherein the flexible tube portion (12) and the straight tube portion (13) are continuously formed wherein the flexible tube portion (12) includes a spiral projection portion (17) in which a first projection (16) having a projecting shape as seen from a tube outer surface side spirally extends in a circumferential direction of the tube outer surface, wherein the straight tube portion (13) includes a straight projection portion (18) in which a second projection continuously extends from an end portion of the spiral projection portion extends in a tube axis direction as the straight tube portion (13), wherein an outer diameter of the first projection of the spiral projection portion is equal to an outer diameter of the second projection of the straight projection portion, and an outer diameter of a recess adjoining to the first projection is equal to an outer diameter of a recess adjoining to the second projection.

(2)

The exterior member (1) in the above described (1), further comprising:

a shield member (5) that is disposed on a tube inner surface side of the resin portion and is made of conductive metal.

(3)

A wire harness comprising:

the exterior member (1) in the above described (1) or (2); and the one conduction path (95) or the plurality of conduction paths (95) accommodated and protected in the exterior member.

(4)

A wire harness (89) which includes an exterior member (1) having a tubular shape and one conduction path (95) or a plurality of conduction paths (95) accommodated and protected in the exterior member, the exterior member including a resin portion (10) including a flexible tube portion (12) having flexibility, wherein the flexible tube portion (12) includes a spiral projection portion (17) in which a projection (16) that has a projecting shape as seen from a tube outer surface side spirally extends in a circumferential direction of the tube outer surface.

(5)

A manufacturing method of an exterior member (1) which has a tubular shape so as to accommodate and protect one conduction path (95) or a plurality of conduction paths (95) and includes a resin portion (10) in which a flexible tube portion (12) having flexibility and a straight tube portion (13) so as to linearly route the conduction path are continuously formed, the method comprising:

forming a spiral projection portion (17) in which a first projection (16) that has a projecting shape as seen from a tube outer surface side spirally extends in a circumferential direction of the tube outer surface as the flexible tube portion (12), and forming a straight projection portion (18) in which a second projection (16) that has a projecting shape as seen from the tube outer surface side continuously extends from an end portion of the spiral projection portion and extends in a tube axis direction as the straight tube portion (13), wherein an outer diameter of the first projection of the spiral projection portion is equal to an outer diameter of the second projection of the straight projection portion, and an outer diameter of a recess adjoining to the first projection is equal to an outer diameter of a recess adjoining to the second projection.

(6)

The manufacturing method of an exterior member in the above described (5), further comprising:

providing a shield member (5) that is disposed on a tube inner surface side of the resin portion (10) and is made of conductive metal.

This application is based on Japanese Patent Application No. 2015-161632 filed on Aug. 19, 2015 and Japanese Patent Application No. 2016-151745 filed on Aug. 2, 2016, the contents of which are incorporated herein by reference.

DESCRIPTION OF REFERENCE NUMERALS AND SIGNS

1 . . . exterior member, 2 . . . extrusion molding machine, 3 . . . resin extruding unit, 4 . . . rotation head, 5 . . . braid (shield member), 6 . . . braid supplying unit, 7 . . . cooling water tank, 8 . . . hopper, 9 . . . extruding unit main body, 10 . . . resin portion, 11 . . . tube inner surface, 12 . . . flexible tube portion, 13 . . . straight tube portion, 14 . . . continuous projection portion, 15 . . . tube outer surface, 16 . . . projection, 17 . . . spiral projection portion, 18 . . . straight projection portion, 19 . . . recess portion, 20 . . . rotation head main body, 21 . . . rotation/driving mechanism, 22 . . . melted resin material, 23 . . . resin material path, 24 . . . resin material extrusion portion, 25 . . . die, 26 . . . nipple, 27 . . . motor, 28 . . . die rotation mechanism, 29 . . . nipple rotation mechanism, 30 . . . through hole, 31 . . . outer surface, 32 . . . resin flow path, 33 . . . braid through hole, 41 . . . rotation head, 42 . . . rotation head main body, 43 . . . rotation/driving mechanism, 44 . . . tubular resin material, 45 . . . protrusion portion, 46 . . . mandrel, 47 . . . mandrel rotation mechanism, 51 . . . rotation head, 52 . . . rotation head main body, 53 . . . rotation/driving mechanism, 54 . . . die, 55 . . . die rotation mechanism, 61 . . . rotation head, 62 . . . intermittent projection portion, 63 . . . non-projecting portion, 64 . . . projecting portion, 65 . . . rotation head main body, 66 . . . ribbed die, 67 . . . rotatory disk, 68 . . . through hole, 71 . . . extrusion molding machine, 72 . . . die holding unit, 73 . . . rotational winding mechanism, 74 . . . die, 75 . . . resin flow path, 76 . . . flow path main body, 77 . . . valley portion, 78 . . . mountain portion, 81 . . . hybrid automobile, 82 . . . engine, 83 . . . motor unit, 84 . . . inverter unit, 85 . . . battery, 86 . . . engine room, 87 . . . automobile rear portion, 88 . . . motor cable, 89 . . . wire harness, 90 . . . intermediate portion, 91 . . . vehicle underfloor portion, 92 . . . junction block, 93 . . . harness terminal, 94 . . . shield connector, 95 . . . conduction path, 201 . . . intermittent projection portion, 202 . . . rotation head, 203 . . . rotation head main body, 204 . . . vacuum pump, 205 . . . inside-type mandrel, 206 . . . outside-type mandrel, 207 . . . recess portion, 208 . . . projection portion, 209 . . . small groove, 210 . . . recess portion, 211 . . . projection portion, 212 . . . small slit, 213 . . . suction path

What is claimed is:

1. An exterior member having a tubular shape so as to accommodate and protect one conduction path or a plurality of conduction paths comprising;
    a resin portion,
    wherein the resin portion includes a flexible tube portion having flexibility and a straight tube portion so as to linearly route the conduction path,
    wherein the flexible tube portion and the straight tube portion are continuously formed,
    wherein the flexible tube portion includes a spiral projection portion in which a first projection having a projecting shape as seen from a tube outer surface side spirally extends in a circumferential direction of the tube outer surface,
    wherein the straight tube portion includes a straight projection portion in which a second projection continuously extends from an end portion of the spiral projection portion extends in a tube axis direction as the straight tube portion,
    wherein an outer diameter of the first projection of the spiral projection portion is equal to an outer diameter of the second projection of the straight projection portion, and an outer diameter of a recess adjoining to the first projection is equal to an outer diameter of a recess adjoining to the second projection.

2. The exterior member according to claim 1 further comprising:
    a shield member that is disposed on a tube inner surface side of the resin portion and is made of conductive metal.

3. A wire harness comprising:
    the exterior member according to claim 1; and
    the one conduction path or the plurality of conduction paths accommodated and protected in the exterior member.

4. A manufacturing method of an exterior member which has a tubular shape so as to accommodate and protect one conduction path or a plurality of conduction paths and includes a resin portion in which a flexible tube portion having flexibility and a straight tube portion so as to linearly route the conduction path are continuously formed, the method comprising:
    forming a spiral projection portion in which a first projection that has a projecting shape as seen from a tube outer surface side spirally extends in a circumferential direction of the tube outer surface as the flexible tube portion; and
    forming a straight projection portion in which a second projection that has a projecting shape as seen from the tube outer surface side continuously extends from an end portion of the spiral projection portion and extends in a tube axis direction as the straight tube portion,
    wherein an outer diameter of the first projection of the spiral projection portion is equal to an outer diameter of the second projection of the straight projection portion, and an outer diameter of a recess adjoining to the first projection is equal to an outer diameter of a recess adjoining to the second projection.

5. The manufacturing method of the exterior member according to claim 4 further comprising:
    providing a shield member that is disposed on a tube inner surface side of the resin portion and is made of conductive metal.

* * * * *